(12) United States Patent
Arai

(10) Patent No.: US 7,706,216 B2
(45) Date of Patent: Apr. 27, 2010

(54) OPTICAL HEAD AND OPTICAL DEVICE PROVIDED WITH OPTICAL HEAD

(75) Inventor: Akihiro Arai, Kyoto (JP)

(73) Assignee: Panasonic Corporation, Kadoma (JP)

( * ) Notice: Subject to any disclaimer, the term of this patent is extended or adjusted under 35 U.S.C. 154(b) by 787 days.

(21) Appl. No.: 10/533,628

(22) PCT Filed: Nov. 4, 2003

(86) PCT No.: PCT/JP03/14081

§ 371 (c)(1),
(2), (4) Date: Oct. 20, 2005

(87) PCT Pub. No.: WO2004/042714

PCT Pub. Date: May 21, 2004

(65) Prior Publication Data

US 2006/0104168 A1 May 18, 2006

(30) Foreign Application Priority Data

Nov. 7, 2002 (JP) ............................... 2002/323459

(51) Int. Cl.
*G11B 7/00* (2006.01)
(52) U.S. Cl. .................. 369/44.26; 369/44.13
(58) Field of Classification Search .............. 369/44.13, 369/44.26, 44.23, 44.35
See application file for complete search history.

(56) References Cited

U.S. PATENT DOCUMENTS 5,537,373 A * 7/1996 Horikiri .................... 369/44.13
5,740,138 A * 4/1998 Hoshino et al. .......... 369/44.29
6,088,307 A * 7/2000 Fushimi et al. .......... 369/44.13
6,122,241 A * 9/2000 Akiyama et al. ....... 369/112.12

(Continued)

FOREIGN PATENT DOCUMENTS

JP          06-309687 A          11/1994

(Continued)

OTHER PUBLICATIONS

Supplementary European Search Report for corresponding Application No. 03770143, dated Dec. 11, 2007.

(Continued)

*Primary Examiner*—Joseph H Feild
*Assistant Examiner*—Aneeta Yodichkas
(74) *Attorney, Agent, or Firm*—Renner, Otto, Boisselle & Sklar, LLP

(57) ABSTRACT

An optical head includes a plurality of light receiving areas, which receive a first type of reflected rays where zero-order and first-order components of the light diffracted by a track are superposed one upon the other to generate a light quantity signal representing the quantity of light of the first type of reflected rays, and a non-light-receiving area, which is provided between the light receiving areas so as not to receive a second type of reflected ray consisting essentially of the zero-order components. As measured in a first direction in which the light receiving areas are arranged, a gap between the light receiving areas is longer than the width of the non-light-receiving area. The optical head further includes a tracking error signal generating section for generating a tracking error signal based on the light quantity signal.

21 Claims, 14 Drawing Sheets

U.S. PATENT DOCUMENTS

| | | | |
|---|---|---|---|
| 6,275,463 B1 * | 8/2001 | Nagata et al. | 369/118 |
| 6,882,616 B2 | 4/2005 | Ichimura et al. | |
| 7,239,603 B1 | 7/2007 | Ogata | |
| 2001/0033528 A1 * | 10/2001 | Sano et al. | 369/44.23 |
| 2001/0055248 A1 * | 12/2001 | Nagata et al. | 369/44.41 |
| 2002/0027843 A1 * | 3/2002 | Kim et al. | 369/44.35 |

FOREIGN PATENT DOCUMENTS

| | | |
|---|---|---|
| JP | 07-14172 | 1/1995 |
| JP | 09-063106 A | 3/1997 |
| JP | 63-222333 | 9/1998 |
| JP | 11-513835 | 11/1999 |
| JP | 11-339285 | 12/1999 |
| JP | 2000-353328 | 12/2000 |
| JP | 2002-230808 | 8/2002 |
| JP | 2002-245628 | 8/2002 |
| JP | 2002-260251 | 9/2002 |
| WO | 02/41311 A1 | 5/2002 |

OTHER PUBLICATIONS

International Search Report for corresponding PCT/JP2003/014081, mailed Mar. 2, 2004.

Notice of Reasons for Rejection, Japanese Application No. 2004-549607, dated Oct. 20, 2009 (with translation).

Notice of Reasons for Rejection, Japanese Application No. 2004-549607, mailed Jan. 26, 2010 and English translation.

* cited by examiner

SHIFT (mm) OF OBJECTIVE LENS (a)

(b)

BEAM SPOT LOCATION (μm)
(ORIGIN: CENTER OF INFORMATION TRACK)

(a)

(b)

OPTICAL HEAD AND OPTICAL DEVICE PROVIDED WITH OPTICAL HEAD

TECHNICAL FIELD

The present invention relates to an optical head for optically reading and/or writing data from/on an information storage medium such as an optical disc.

BACKGROUND ART

Recently, densities of optical discs have been further increased. For example, a phase change optical disc, on which preformed grooves have a pitch of 0.32 µm, information tracks also have a track pitch of 0.32 µm and a coating layer to protect its information storage layer has a thickness of 0.1 mm, is known as a typical optical disc with an increased density. To read and/or write data from/on such an optical disc, the optical head of an optical disc drive may include a light source with a wavelength of 405 nm and an objective lens with a numerical aperture NA of 0.85, for example.

A high-density optical disc has such a narrow information track pitch that the optical head needs to perform a tracking control operation with very high precision. Accordingly, once a deviation has occurred in a tracking error signal due to the shift of the objective lens or the tilt of the optical disc, the tracking control operation can no longer be performed with the required precision, thus causing some problems. As used herein, the "deviation" of the tracking error signal refers to a gap (or distance) between the beam spot location and the center of the information track when the tracking error signal crosses the zero level.

Also, data is written on a phase change optical disc by changing the reflectance. The phase change optical disc has a narrow track pitch between adjacent information tracks. Accordingly, if the adjacent information tracks have mutually different reflectances, then the tracking error signal could not be detected accurately due to the difference. Furthermore, due to an error occurring during the manufacturing process of optical discs, the information track pitch might be variable from one location to another. In that case, the tracking error signal could not be detected accurately, either. Then, the tracking control operation could not be carried out with sufficient precision on a high-density optical disc. For that reason, efforts for detecting the tracking error signal as accurately as possible have been carried on.

For example, PCT International Application Publication No. WO 97/15923 discloses a technique of reducing the deviation that could occur in a tracking error signal due to the shift of an objective lens and the tilt of an optical disc. Hereinafter, a configuration for realizing the technique disclosed in this document will be described.

FIG. 1(a) shows a configuration for a conventional optical head 100. The optical head 100 includes: a light source 101; a lens 102 for transforming the light emitted from the light source 101 into luminous flux of parallel rays; half mirrors 103 and 106 for reflecting a portion of incoming light and transmitting another portion of the light; an objective lens 104 for focusing the light; a focus control section 107 for performing a focus control operation by detecting the luminous flux that has been reflected from an optical disc 105; and a light receiving section 108 for receiving the luminous flux, reflected from the optical disc 105, at a plurality of light receiving areas.

The optical head 100 operates in the following manner. Specifically, the light emitted from the light source 101 is focused on the optical disc 105 by way of the lens 102, half mirror 103 and objective lens 104. A portion of the luminous flux of reflected rays, which has been reflected from the optical disc 105, is further reflected by the half mirror 106 toward the focus control section 107. The rest of the reflected luminous flux is transmitted through the half mirror 106 to enter the light receiving section 108. The focus control section 107 detects a focus error signal based on the received signal and controls the distance between the objective lens 104 and the optical disc 105 with the detected signal such that the light emitted from the light source 101 is focused on the optical disc 105 with a desired precision. On the other hand, the signal received at the light receiving section 108 is used to generate a tracking error signal. The light is focused on an information track, which extends in the direction coming out of the paper.

FIG. 1(b) shows the cross section of the luminous flux received at the light receiving section 108. The cross section 110 of the luminous flux is split into two by a division line 109a, which extends parallel to the information tracks, and further split by two more division lines 109b and 109c, which cross the division line 109a at right angles. In this manner, the cross section of the luminous flux is divided into eight areas 108a through 108h. As the optical disc 105 rotates, the beam spot of the reflected light apparently moves from the area 108a toward the area 108g, for example. On the other hand, the area 108i is a light shielding area, which cuts off the incident light. The light rays falling on these areas 108a through 108h are detected as signals representing their respective quantities of light. If the signals detected by these areas 108a through 108h are identified by their reference numerals, the tracking error signal TE is given by:

$$TE=(108c+108e-108d-108f)-k(108a+108g-108b-108h) \quad (1)$$

where k is a correction factor. If the objective lens 104 is moved perpendicularly to the information tracks, then the cross section 110 of the luminous flux shifts perpendicularly to the division line 109a on the light receiving section 108. As a result, an offset is produced in a so-called push-pull signal (108c+108e−108d−108f). This offset is corrected with the signal (k(108a+108g−108b−108h)). The correction factor k is defined such that the offset of the tracking error signal decreases as the objective lens 104 moves.

It should be noted that the "deviation" and "offset" of the tracking error signal are two different notions. Specifically, the "deviation" of the tracking error signal changes incessantly according to the positional relationship between the focal point of the light beam and the information storage layer and the reflectance of the information storage layer. Accordingly, the deviation cannot be minimized uniformly by using a factor such as the correction factor described above. On the other hand, the "offset" of the tracking error signal is produced steadily in the overall signal due to the shift of the objective lens described above, for example, and can be reduced uniformly with the correction factor.

FIG. 2 schematically shows the light intensity distribution of the luminous flux 110 that has been reflected from the tilted optical disc 105. As used herein, "tilting" means tilting a normal, which is defined perpendicularly to the optical disc 105, parallel to the paper in FIG. 1(a). When the optical disc 105 tilts, the light diffracts on the information track, thus making the light intensity distribution of the reflected light non-uniform. In FIG. 2, the hatched areas 110-1 represent the areas in which zero-order and first-order components of the luminous flux diffracted by the information track are superposed one upon the other. The remaining area 110-2 of the luminous flux 110, other than the hatched areas 110-1, represents an area receiving only the zero-order diffracted light, i.e., where no diffracted light components are superposed. As can be seen from FIG. 2, the hatched areas 110-1 are asymmetric with respect to the division line 109a.

When the light intensity distribution is asymmetric, the light receiving section 108 cannot judge whether that state was caused by the tilt of the optical disc 105 or by a bad tracking state. If a tracking error signal is generated from such reflected light, then the tracking error signal will represent the bad tracking state all the way and therefore have a low signal precision. For that reason, the light shielding area 108i is provided as shown in FIG. 1(b) such that the portion of the light corresponding to the significantly asymmetric portion of the intensity distribution is not converted into a signal (i.e., not used to generate or detect a tracking error signal). In this manner, the detection errors of the tracking error signal can be reduced.

There are some optical discs on which address information and other identification information is pre-recorded as wobbles of information tracks (i.e., by way of a wobble signal). FIG. 3 is a partial enlarged view of wobbled information tracks 105-1 through 105-3 on the optical disc 105. These information tracks 105-1 through 105-3 have respective wobbles representing the information recorded there. The wobbles of the three information tracks 105-1 through 105-3 change independently of each other. The technique of detecting such a wobble signal with a push-pull signal is disclosed in Japanese Laid-Open Publication No. 7-14172, for example.

The tracking error signal to be obtained from the light reflected from the high-density optical disc 105 will be described by reference to the results of numerical simulations. Those simulations were done with the conventional optical head 100 shown in FIG. 1 under the conditions that the light had a wavelength of 405 nm, the information tracks had a track pitch of 0.32 μm and a groove depth that was one-twelfth of the wavelength, the NA was 0.85, and the objective lens had a focal length of 2 mm. It should be noted that the information track groove is a recessed groove defined between two raised information tracks. The information tracks and information track grooves are defined herein as such. However, when viewed from over the other side of the optical disc 105, the tracks and track grooves will be recessed and raised, respectively. Thus, the following description will be mainly focused on the "information tracks".

Hereinafter, it will be described how the tracking error signal should be affected in respective situations where the objective lens has shifted, where the optical disc is tilted, where the pitch between the information tracks is variable, and where adjacent information tracks have mutually different reflectances.

(1) Offset of Tracking Error Signal Due to the Shift of Objective Lens:

FIG. 4 schematically shows the light intensity distribution of a luminous flux that was reflected from the high-density optical disc and detected by the light receiving section. The hatched areas represent areas where the zero-order and first-order components of the luminous flux, diffracted by the information track grooves of the optical disc 105, were superposed one upon the other. The other non-hatched area consisted essentially of the zero-order diffracted light only (i.e., the area where no diffracted light components were superposed). Compared with the light intensity distribution shown in FIG. 1(b) or FIG. 2, the gap L between the two hatched areas is wider and the area consisting essentially of the zero-order diffracted light is broader in the light intensity distribution shown in FIG. 4. This is because the high-density optical disc has a narrower pitch between the information tracks.

In such a distribution, the push-pull signal has a low degree of modulation, and therefore, even if the objective lens 104 has been shifted just slightly, a non-negligible offset will be produced in the signal. Such a luminous flux is received at the respective divided areas shown in FIG. 4. The gap between the two division lines 109b and 109c is approximately equal to the maximum width of the diffracted light superposed areas (i.e., the hatched areas shown in FIG. 4) as measured along the division line 109a. It should be noted that the light shielding area 108i shown in FIG. 1(b) is not provided because the offset correction is the only concern here.

FIG. 5 shows a relationship between the shift of the objective lens 104 and the symmetry of the tracking error signal. The abscissa represents the shift of the objective lens while the ordinate represents the symmetry of the tracking error signal. The symmetry is obtained herein as the ratio of the offset voltage to the voltage amplitude. It can be seen that while the shift of the objective lens falls within the range of ±0.3 mm, good symmetry is maintained and the offset is corrected sufficiently.

(2) Non-Uniform Information Track Pitch

If the pitch between information tracks is non-uniform, then some pair of adjacent information tracks at one location on the optical disc 105 may be relatively close to each other but another pair of adjacent information tracks at another location on the optical disc 105 may be relatively distant from each other. FIG. 6 shows a model on which the leftmost one of three information tracks may be displaced. On this model, the waveform of the tracking error signal was simulated.

FIGS. 7(a) and 7(b) show the waveforms of the tracking error signals obtained by displacing the leftmost information track. In this case, the information track was displaced by ±20 nm. FIG. 7(a) shows the waveforms of push-pull signals with no offset corrected. In FIG. 7(a), the beam spot location (i.e., the focal point of the light beam) of zero is the center of the reference information track and corresponds to the center of the central track shown in FIG. 6 (which will be referred to herein as the "center track"). In the range where the beam spot locations are negative, signals representing the leftmost information track to be displaced in FIG. 6 appear. On the other hand, in the range where the beam spot locations are positive, signals representing the rightmost information track in FIG. 6 appear.

The three signal waveforms 114, 115 and 116 shown in FIG. 7(a) are signals obtained by displacing the leftmost information track in three stages. More specifically, the waveform 115 is obtained by arranging the leftmost information track at the originally designed location; the waveform 114 is obtained by displacing the leftmost information track by 20 nm toward the center track; and the waveform 116 is obtained by displacing the leftmost information track by 20 nm away from the center track. It should be noted that the rightmost track is supposed to be arranged just as originally designed. In FIG. 7(a), a significant offset variation is observed in the vicinity of each information track displaced from the original location (i.e., near the left-hand-side peak of the waveform), which shows the effects of the non-uniform information track pitch.

FIG. 7(b) shows the waveforms of tracking error signals of which the offsets are corrected. The offsets are corrected with an objective lens position signal. As in FIG. 7(a), the three waveforms 117, 118 and 119 shown in FIG. 7(b) are signals obtained by displacing the leftmost information track in three stages. More specifically, the waveform 118 is obtained by arranging the leftmost information track at the originally designed location; the waveform 117 is obtained by displacing the leftmost information track by 20 nm toward the center track; and the waveform 119 is obtained by displacing the leftmost information track by 20 nm away from the center track. Compared with FIG. 7(a), the effects of the offset variation on the signal waveforms are reduced significantly in FIG. 7(b). This means that the offset variation caused by the non-uniformity of information track pitches is corrected by the offset correcting means described above. It should be noted that the correction factor used in the calculations for FIG. 7(b) has the same value as the correction factor for correcting the offset of the objective lens as described above.

(3) Tilt of the Optical Disc:

Next, it will be considered whether or not the deviation of the tracking error signal due to the tilt of the optical disc 105 can be reduced when the light shielding area 108i (see FIG. 1(b)) is provided for the light receiving section 108. It should be noted that the "deviation" of the tracking error signal refers to the gap (or distance) between the beam spot location and the center of the information track when the tracking error signal crosses the zero level as described above.

FIG. 8 shows how the waveform of the tracking error signal changes when the width of the light shielding area 108i is changed in the direction in which the division line 109a (see FIG. 1(b)) extends. The abscissa represents the beam spot location, which is defined with respect to the center of the information track as the origin, while the ordinate represents the signal level. The width of the light shielding area 108i was changed in three steps, thereby obtaining three waveforms 111, 112 and 113. Specifically, the waveform 111 was obtained when the width of the light shielding area 108i was zero (i.e., when no light shielding area 108i was provided), the waveform 112 was obtained when the width of the light shielding area 108i was 20% of the diameter of the luminous flux, and the waveform 113 was obtained when the width of the light shielding area 108i was 35% of the diameter of the luminous flux. The coating layer of the optical disc 105 had a thickness of 100 µm and the disc had a tilt of 0.6 degrees.

As can be seen from FIG. 8, at the zero beam spot location, the signal levels should have been equal to zero but the actual signal levels decreased below the zero level and the magnitudes of the deviations were in the order of the waveforms 111, 112 and 113. That is to say, the greater the width of the light shielding area 108i, the greater the deviation of the tracking error signal. Consequently, as for high-density optical discs to be developed and put on the market in the near future, the deviation of the tracking error signal cannot be reduced by the conventional technique.

(4) Offset Produced in the Tracking Error Signal on the Boundary Between Information Tracks with Different Reflectances:

FIG. 9 shows the cross sections of three information tracks. Among the tracks shown in FIG. 9, the center track and another information track on the right-hand side are supposed to have a reflectance of 1 and be unrecorded tracks. On the other hand, the other hatched information track on the left-hand side is supposed to have a reflectance of 0.5 and be a recorded track. The optical disc 105 is supposed to have multiple sets of these tracks that are arranged periodically.

FIG. 10(a) shows the waveforms of push-pull signals of which the offsets are not corrected. Among the three signal waveforms shown in FIG. 10(a), the bold curve represents the waveform of a push-pull signal at the focal point of the beam spot, the solid curve represents the waveform of a push-pull signal when the focal point of the beam spot is shifted by +0.2 µm, and the dashed curve represents the waveform of a push-pull signal when the focal point of the beam spot is shifted by −0.2 µm. The focal point of the beam spot is "shifted" perpendicularly to the optical disc 105, i.e., in the direction in which the light beam is radiated toward the optical disc 105. In this case, the positive direction refers to shifting the focal point toward the optical head as viewed from the optical disc 105, while the negative direction refers to shifting the focal point in the opposite direction. In these waveforms, a significant offset variation due to the difference in reflectance between adjacent information tracks and the change of that offset variation with the focus shift of the beam spot are recognized.

Thus, the waveforms of offset-corrected tracking error signals were calculated using the same correction factor as that used to correct the offset resulting from the shift of the objective lens. FIG. 10(b) shows the waveforms of tracking error signals of which the offsets are corrected. Among the three signal waveforms shown in FIG. 10(b), the bold curve represents the waveform of a push-pull signal at the focal point of the beam spot, the solid curve represents the waveform of a push-pull signal when the focal point of the beam spot is shifted by +0.2 µm, and the dashed curve represents the waveform of a push-pull signal when the focal point of the beam spot is shifted by −0.2 µm. It can be seen that the offset variations of the three waveforms shown in FIG. 10(b) are much less remarkable than those shown in FIG. 10(a).

However, around the beam spot locations of 0 µm and +0.32 µm, the offset variation changes with the focal point of the beam spot and the three waveforms cross the zero level at mutually different locations. In addition, the magnitude of change of the offset variation with the focal point of the beam spot is not constant among the three information tracks. Accordingly, even if the correction factor for the offset correction is changed, the deviation of the tracking error cannot always be reduced for every information track.

To sum up, the above-mentioned combination of conditions for a high-density optical disc has no effects of reducing the deviation of the tracking error signal resulting from the tilt of the optical disc as described for (3) and cannot correct sufficiently the offset variation produced in the tracking error signal on the boundary between information tracks with different reflectances (or the offset variation caused by the focus shift of the beam spot, in particular) as described for (4).

Furthermore, in an optical disc with wobbled information tracks (see FIG. 3), the gap between the central information track and its adjacent information track changes with this wobble. As already described with reference to FIGS. 7(a) and 7(b), the push-pull signal is easily affected by the adjacent information track. The wobble signal of one information track may be represented by the distance from its adjacent information track. Accordingly, if the wobble signal is detected with the push-pull signal to be easily affected by the adjacent information track, then crosstalk will increase between the wobble signals of the two adjacent information tracks.

DISCLOSURE OF INVENTION

An object of the present invention is to get a tracking control done exactly on the center of a target information track on an optical disc. Another object of the present invention is to detect a wobble signal from an optical disc, on which information is recorded as wobbles, while minimizing a crosstalk phenomenon to be caused between the wobble signals of two adjacent information tracks.

An optical head according to the present invention is used to read and/or write data from/on a storage medium having at least two tracks with mutually different reflectances. The optical head includes: a light source; an objective lens for focusing light, which has been emitted from the light source, onto one of the tracks of the storage medium; and light receiving means. The light receiving means includes a plurality of light receiving areas and a non-light-receiving area. The light receiving areas receive a first type of reflected rays, where zero-order and first-order components of the light diffracted by the track are superposed one upon the other, to generate a light quantity signal representing the quantity of light of the first type of reflected rays. The non-light-receiving area is provided between the light receiving areas so as not to receive a second type of reflected ray consisting essentially of the zero-order components. As measured in a first direction in which the light receiving areas are arranged, a gap between the light receiving areas is longer than the width of the non-light-receiving area. The optical head further includes tracking error signal generating means for generating a tracking error signal based on the light quantity signal.

As measured in a second direction perpendicular to the first direction, the length of the light receiving areas may be smaller than the width of the first type of reflected rays.

As measured in the second direction, the overall length of the light receiving areas may be greater than a luminous flux of reflected rays.

If the light source radiates light with a wavelength $\lambda$, the objective lens has a numerical aperture NA and the track has a period T, the optical head may read and/or write data from/on a storage medium that satisfies the inequality $0.44 < \lambda/(NA \cdot T) - 1$.

The optical head may further include light splitting means for splitting a luminous flux of reflected rays into the first and second types of reflected rays.

A drive according to the present invention makes an optical head read and/or write data from/on a storage medium having at least two tracks with mutually different reflectances. The optical head includes: a light source; an objective lens for focusing light, which has been emitted from the light source, onto one of the tracks of the storage medium; and light receiving means. The light receiving means includes a plurality of light receiving areas and a non-light-receiving area. The light receiving areas receive a first type of reflected rays, where zero-order and first-order components of the light diffracted by the track are superposed one upon the other, to generate a light quantity signal representing the quantity of light of the first type of reflected rays. The non-light-receiving area is provided between the light receiving areas so as not to receive a second type of reflected ray consisting essentially of the zero-order components. As measured in a first direction in which the light receiving areas are arranged, a gap between the light receiving areas is longer than the width of the non-light-receiving area. The optical head further includes tracking error signal generating means for generating a tracking error signal based on the light quantity signal and shifting means for changing the position of the lens parallel to the tracks responsive to a drive signal. The drive further includes: control signal generating means for generating a control signal that controls the position of the lens such that the light follows the tracks of the optical disc on the storage medium in response to the tracking error signal, and driving means for generating the drive signal that drives the shifting means in response to the control signal.

BEST MODE FOR CARRYING OUT THE INVENTION

Hereinafter, preferred embodiments of an optical disc drive and an optical head according to the present invention will be described with reference to the accompanying drawings.

Embodiment 1

Figure 11:
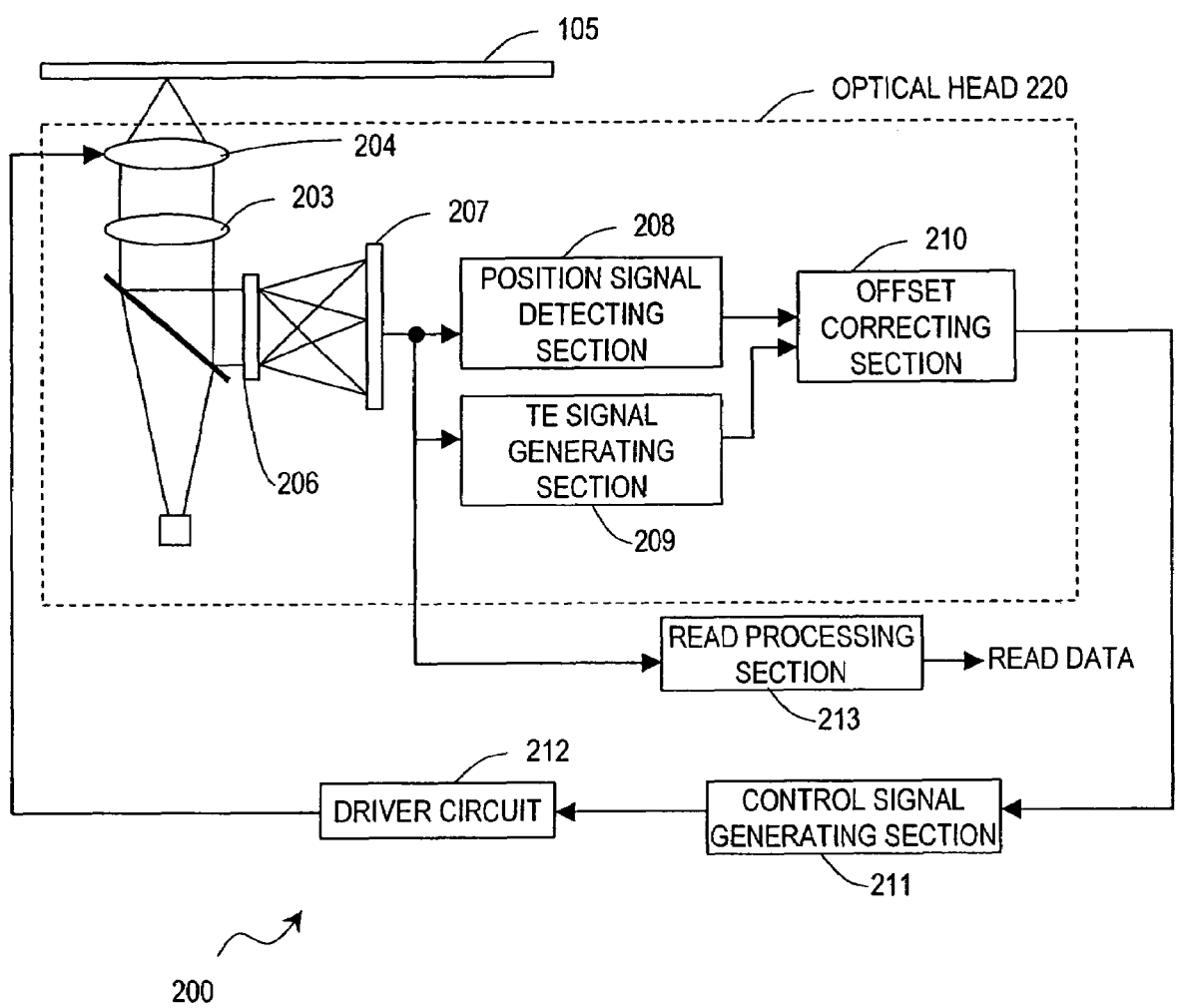
FIG. 11 is a block diagram of an optical disc drive 200 according to the present invention.

FIG. 11 shows how functional blocks of an optical disc drive 200 according to a first embodiment of the present invention may be arranged. The optical disc drive 200 includes an optical head 220, a control signal generating section 211, a driver circuit 212 and a read processing section 213. The optical disc drive 200 can read and/or write data from/on a given optical disc.

The optical head 220 is an optical system for emitting a light beam toward the optical disc 105 and receiving the light that has been reflected from the optical disc 105. The optical head 220 reads and/or writes data from/on the optical disc 105. Furthermore, the optical head 220 includes a signal processor for generating a tracking error signal (which will be referred to herein as a "TE signal"), a focus error (FE) signal, a read signal and other signals. The detailed configuration of the optical head 220 will be described later. The optical disc 105 is shown in FIG. 11 just for convenience sake. Thus, it should be noted that the optical disc 105 is not an integral part of the optical disc drive 200. The optical disc 105 is supposed to be loaded into the optical disc drive 200.

In response to the TE signal supplied from the optical head 220, for example, the control signal generating section 211 generates a control signal for controlling the radial positional relationship between the light beam spot and the information track of the optical disc 105. The control signal generated by the control signal generating section 211 is output to the driver circuit 212. In response to the control signal received, the driver circuit 212 generates a drive signal and then supplies it to a tracking actuator or the transport stage (not shown) of the optical head 220. Each of the tracking actuator and transport stage moves either an objective lens 204 only or the optical head 220 in its entirety in the radial direction of the optical disc 105, thereby controlling the radial positional relationship between the light beam spot and the information track of the optical disc 105. While a servo control operation such as a focus control or a tracking control is being carried out with good stability, the read processing section 213 performs a predetermined read process on the light that has been reflected from the optical disc 105, thereby reading the data from the optical disc 105.

Figure 12:
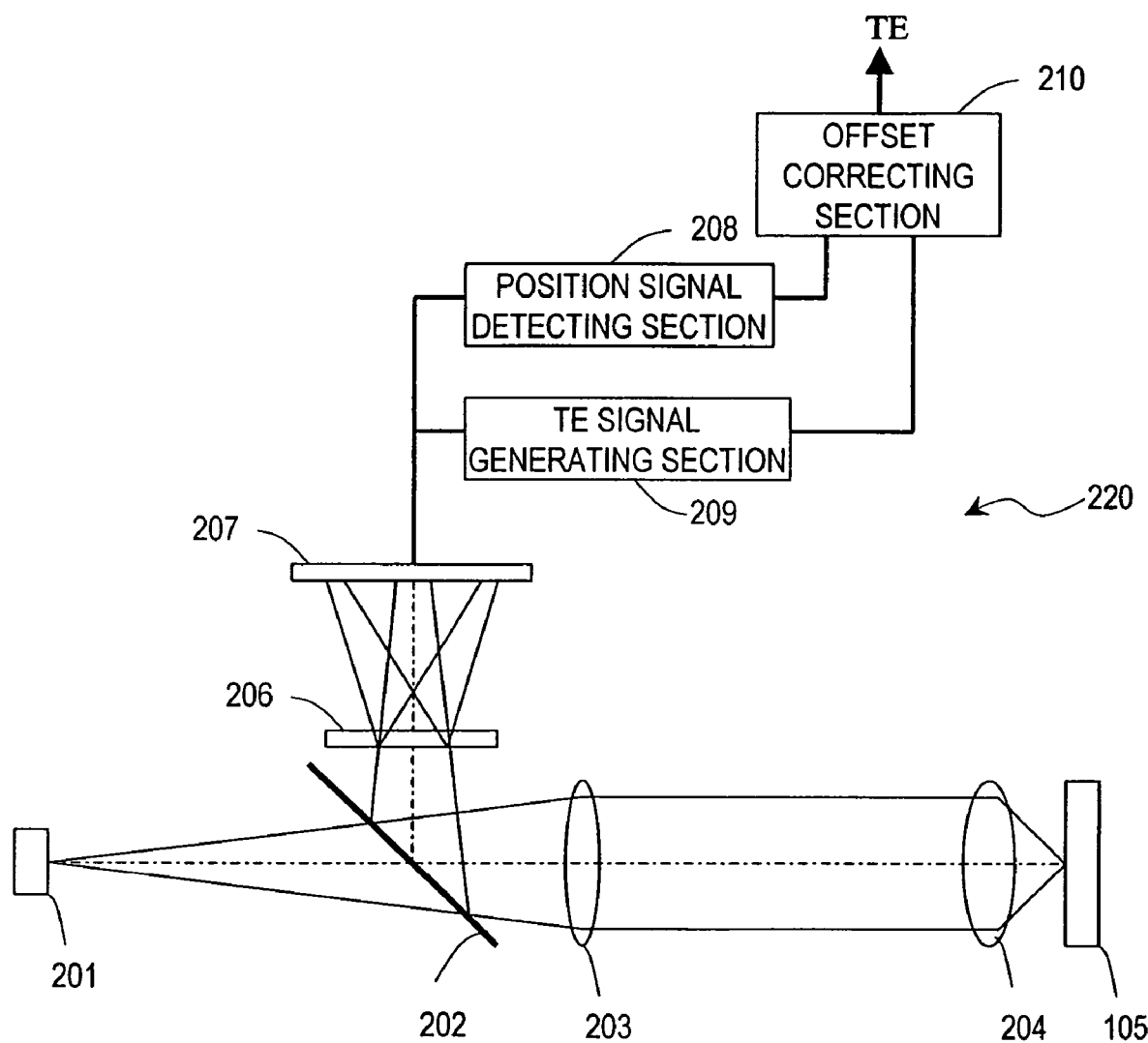
FIG. 12 shows a configuration for an optical head 220 according to a first embodiment.

Next, the configuration of the optical head 220 will be described. FIG. 12 shows a configuration for an optical head 220 according to this embodiment. The optical head 220 includes a light source 201, a beam splitter 202, a collimator lens 203, the objective lens 204, a diffraction element 206, a light receiving section 207, a position signal detecting section 208, a TE signal generating section 209 and an offset correcting section 210.

The light source 201 may emit a violet laser beam with a wavelength of 405 nm, for example. The beam splitter 202 transmits a portion of the laser beam and reflects the rest of the light. The collimator lens 203 transforms the light coming from the light source 201 into a luminous flux of rays. The objective lens 204 converges the light beam coming from the light source 201, thereby forming a focal point at a predetermined distance from the objective lens 204. The diffraction element 206 receives the luminous flux that has been reflected from the optical disc 105 and then selectively passes a portion of the luminous flux through one or more predetermined diffraction regions or cuts off the rest of the luminous flux with one or more opaque regions. To selectively pass or cut off a given luminous flux in this manner will be referred to herein as "splitting" the luminous flux. The light receiving section 207 includes a plurality of light receiving areas, each of which generates a light quantity signal representing the quantity of light received there. The position signal detecting section 208 detects the positions of the light receiving section 207 and objective lens. The offset correcting section 210 corrects the offset to be produced in the TE signal in cooperation with the TE signal generating section 209.

Hereinafter, it will be described, along the optical path of the light, exactly how this optical head 220 carries out its processing. The light radiated from the light source 201 is transmitted through the beam splitter 202, transformed into a luminous flux of parallel rays by the collimator lens 203, incident onto the objective lens 204, and then focused by the objective lens 204 onto the information storage layer of the optical disc 105.

Thereafter, the light is reflected from the optical disc 105, passed through the objective lens 204 and collimator lens 203 again, incident onto the beam splitter 202 and then reflected by the beam splitter 202 toward the diffraction element 206, where the luminous flux of reflected rays is split into multiple light rays through diffraction. The light receiving section 207 includes a plurality of light receiving areas to receive the respective light rays that have been produced by the splitting action of the diffraction element 206. That is to say, those light rays, obtained by getting the luminous flux split by the diffraction element 206, are guided to their associated light receiving areas provided on the light receiving section 207. In response, the respective light receiving areas generate signals representing the quantities of light received there.

From some of the light receiving areas of the light receiving section 207, a signal for generating the TE signal is output to the TE signal generating section 209. On the other hand, from another light receiving area of the light receiving section 207, a signal for detecting the position signal of the objective lens 204 is output to the position signal detecting section 208. In response to the signal supplied from the light receiving section 207, the TE signal generating section 209 generates the TE signal and outputs it to the offset correcting section 210. In accordance with the signal supplied from the light receiving section 207, the position signal detecting section 208 detects the position signal of the objective lens 204 and then passes it to the offset correcting section 210.

The offset correcting section 210 sets the correction factor so as to decrease the offset of the TE signal and performs predetermined computation processing, thereby generating an offset-corrected TE signal. It should be noted that an offset is produced in the TE signal by changing the position of the objective lens 204. By using this offset-corrected TE signal, the control signal generating section 211 shown in FIG. 11 generates a control signal and performs the tracking control just as intended. It should be noted that the optical head actually needs some other normal components, including a focus detecting section and a driving section to change the position of the objective lens. However, since all of those additional components may be known ones, the description thereof will be omitted herein.

Figure 13:
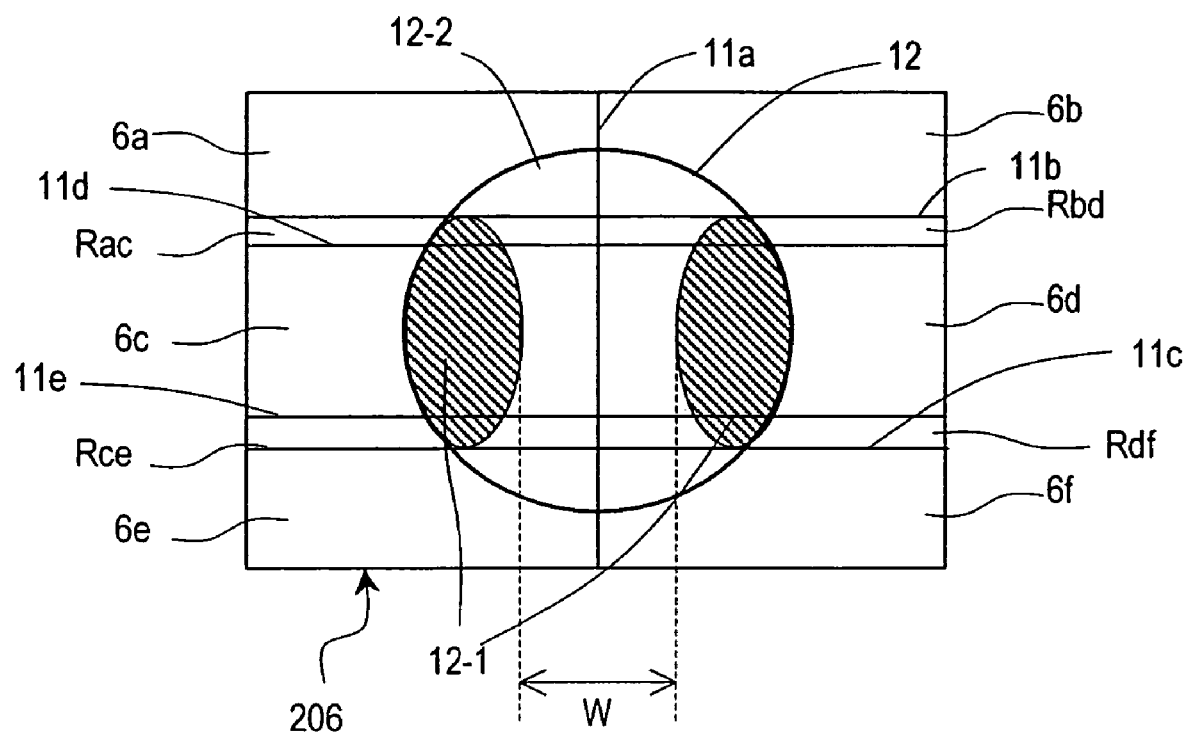
FIG. 13 shows how an incoming luminous flux is split to multiple areas.

Hereinafter, it will be described in detail how the incoming luminous flux is split by the diffraction element 206. FIG. 13 shows how the incoming luminous flux is split to multiple areas. The four areas 6a, 6b, 6e and 6f are areas through which light rays for detecting the objective lens position signal pass, while the two areas 6c and 6d are areas through which light rays for detecting the TE signal pass. The division lines 11a through 11e split the incoming luminous flux. Specifically, the division line 11a splits the luminous flux into two along the information tracks. The division lines 11b and 11c are borders defining the objective lens position signal detecting areas and split the luminous flux perpendicularly to the information tracks. The division lines 11d and 11e are borders defining the TE signal detecting area and also split the luminous flux perpendicularly to the information tracks.

Furthermore, the area Rac between the areas 6a and 6c, the area Rbd between the areas 6b and 6d, the area Rce between the areas 6c and 6e, and the area Rdf between the areas 6d and 6f are opaque areas that are designed so as not to guide the incoming light to the light receiving section 207. These areas are provided so as to prevent the light entering these areas from being used to detect the TE signal or objective lens position signal. To achieve such an object, however, the optical head 220 may adopt a different configuration. For example, a diffraction grating may be provided in these areas to prevent the light from being guided to the light receiving areas of the light receiving section 207. Alternatively, no features may be provided for these areas but instead the light receiving areas may be selectively removed from the light receiving section 207 on which the light rays, having passed through these areas, will be incident.

FIG. 13 illustrates the beam spot shape 12 of the luminous flux that has entered this diffraction element 206. The hatched areas 12-1 represent the areas in which the zero-order and first-order components of the diffracted light coming from the information track are superposed one upon the other. The remaining area 12-2 of the beam spot 12, other than those hatched, represents an area where only the zero-order component of the diffracted light is incident.

For example, if a signal that has passed through the area 6c of the diffraction element 206 shown in FIG. 13 and then detected at its associated light receiving area of the light receiving section 207 is identified by "6c", then the corrected TE signal is given by $$TE=(6c-6d)-k(6a+6e-6b-6f) \quad (2)$$

where k is the offset correction factor. The first term of Equation (2) is the uncorrected TE signal (i.e., push-pull signal) and the second term multiplied by k is the objective lens position signal. These are just as already described for the prior art.

One of the principal features of the optical head 220 of this embodiment is that in the direction parallel to the information tracks (i.e., along the division line 11a), the gap between the division lines 11d and 11e is set shorter than the maximum length of the areas (i.e., the hatched areas 12-1 shown in FIG. 13) in which the zero-order and first-order components of the diffracted light coming from the information track are superposed one upon the other. The optical head 220 is also characterized in that the overall length of the diffraction element 206 as measured perpendicularly to the information tracks (i.e., along the division lines 11b and 11d) is equal to or greater than the diameter of the beam spot 12. Thus, the deviation of the TE signal, caused by the tilt of the optical disc 105, can be reduced. In this case, the tilt of the optical disc 105 means a tilt to be produced by rotating the plane of the optical disc 105 on the tangential line of the information tracks, i.e., a radial tilt.

Figure 14:
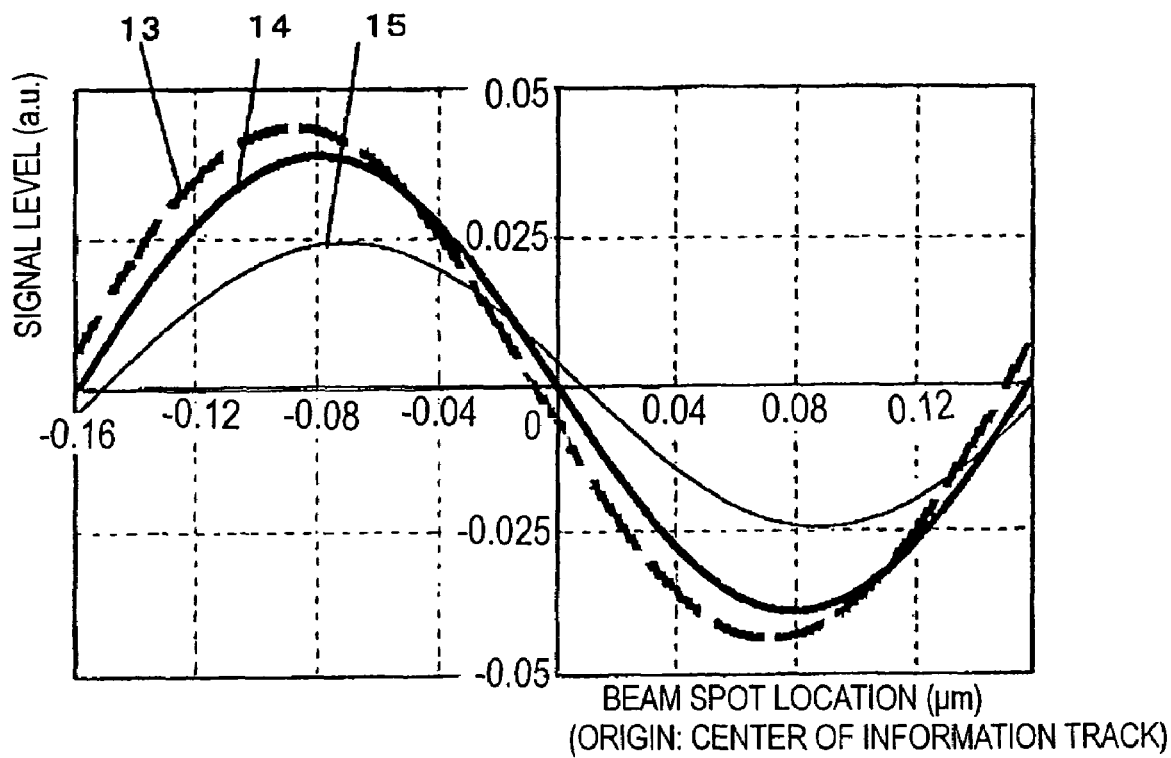
FIG. 14 is a graph showing the waveforms of TE signals when the optical disc has a tilt of 0.6 degrees.

Next, the TE signal to be obtained by this configuration will be described. FIG. 14 shows the waveforms of TE signals when the optical disc has a tilt of 0.6 degrees. The abscissa represents the beam spot location, which is defined with respect to the center of the information track as the origin, while the ordinate represents the signal level. The numerical calculations were carried out under the combination of conditions that adjacent information track grooves had a pitch of 0.32 μm, the light had a wavelength of 405 nm, the objective lens had an numerical aperture of 0.85 and the coating layer had a thickness of 100 nm. Also, supposing the gap between the division lines 11b and 11c is identified by V1, the gap between the division lines 11d and 11e is identified by V2, and these values V1 and V2 are represented as ratios to the diameter of the beam spot 12, V1 was assumed to be constant at 0.65.

FIG. 14 shows the TE signals obtained by changing the gap V2 between the division lines 11d and 11e. Specifically, the waveform 13 represents a situation where V2=V1=0.65, the waveform 14 represents a situation where V2=0.43, and the waveform 15 represents a situation where V2=0.25. The zero-crossing points of the waveforms 13, 14 and 15 are located on the negative side (i.e., on the left-hand side of the origin), right on the origin, and on the positive side (i.e., on the right-hand side of the origin), respectively. Accordingly, under these conditions, by setting V2 equal to 0.43, the deviation of the TE signal resulting from the tilt of the optical disc 105 (i.e., the gap between the zero-crossing point of the waveform of the TE signal and the center of the information track) can be substantially eliminated. Also, if the pitch between adjacent information track grooves and the numerical aperture change, then the best V2 value changes, too. For that reason, V2 is preferably modified according to the conditions. However, the conditions to which this embodiment is applicable are limited to the range to be described below.

Hereinafter, the range to which this embodiment is applicable will be described. As can be seen from FIG. 14, unless this embodiment is applied with V1 set equal to V2, the zero-crossing point of the TE signal shifts to the left-hand side of the origin (as indicated by the waveform 13 in FIG. 14). However, if this embodiment is applied with V2 decreased, then the zero-crossing point shifts rightward (as indicated by the waveforms 14 and 15 in FIG. 14). In other words, unless the direction in which the zero-crossing point shifts due to the tilt of the optical disc 105 when this embodiment is not applied is opposite to the direction in which the zero-crossing point shifts with V2 decreased by applying this embodiment, the tracking error cannot be reduced.

Figure 15:
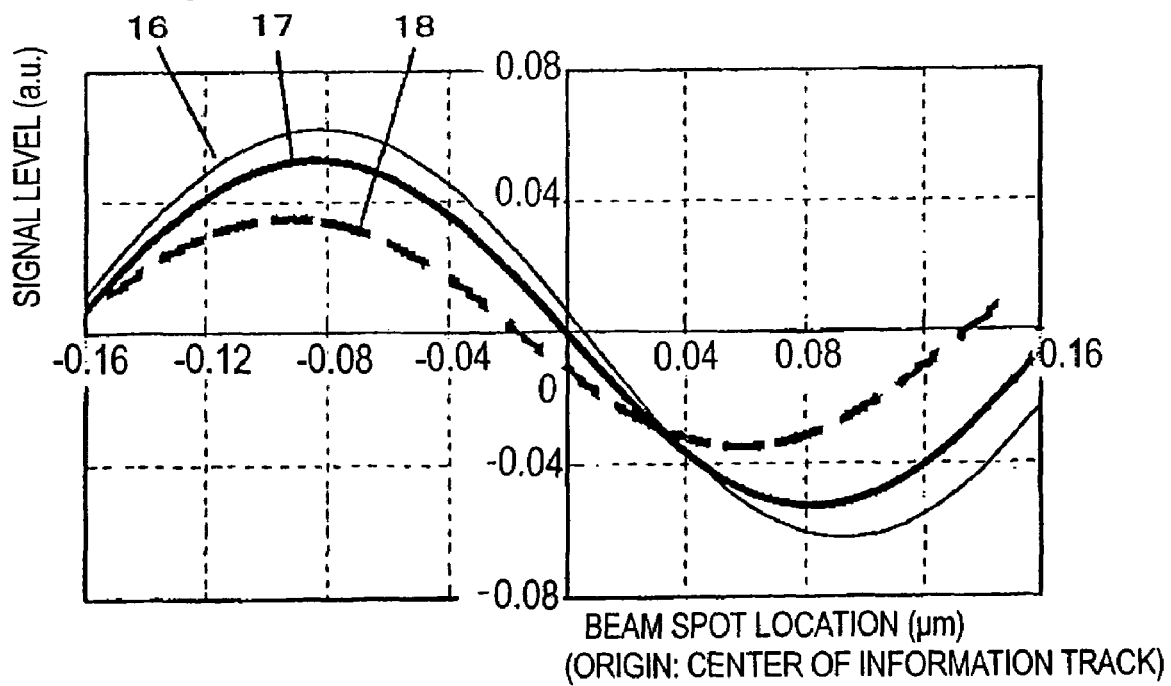
FIG. 15 is a graph showing how the waveforms of TE signals change when only the information track pitch is changed.

FIG. 15 shows how the waveforms of TE signals change when V1 is set equal to V2 and when only the information track pitch is changed. Specifically, the waveform 16 is associated with an information track pitch of 0.35 μm, the waveform 17 is associated with an information track pitch of 0.33 μm, and the waveform 18 is associated with an information track pitch of 0.3 μm. The abscissa and ordinate of this graph represent the same quantities as the counterparts of FIG. 14 do. Due to the tilt of the optical disc 105, the zero-crossing points of the waveforms shift in the negative direction as the information track pitch decreases. In the calculations shown in FIGS. 14 and 15, the optical disc 105 is supposed to be tilted in the same direction. Thus, it can be understood that the tracking error can be reduced by decreasing V2 only when the zero-crossing point of the waveform is located on the negative range (i.e., only when the information track pitch is smaller than 0.33 μm).

Next, this restriction condition is generalized. The shift of the zero-crossing point of the TE signal due to the tilt of the optical disc 105 is caused by a coma aberration to be produced when the light passes through the coating layer (not shown) of the tilted optical disc 105. Also, this shift results from a variation in intensity distribution in the areas where the zero-order and first-order components of the diffracted light coming from the information track are superposed one upon the other. This variation in intensity distribution is determined by how those components are superposed at the edges of the luminous flux with a wave aberration. Accordingly, the shift of the zero-crossing point depends on the wavelength, information track pitch, and numerical aperture of the objective lens. Supposing the wavelength is denoted by λ, the information track pitch is T and the numerical aperture of the objective lens is NA, a quantity U is defined by $$U=\lambda/(T \cdot NA)-1 \quad (3)$$

This quantity U represents the ratio of the gap W between the right and left hatched areas shown in FIG. 13 to the diameter of the luminous flux. If the boundary conditions of the present invention and the prior art, i.e., T=0.33 μm, NA=0.85 and $\lambda$=405 nm, are substituted into Equation (3), then U is 0.44. Equation (3) shows that as T is decreased, U increases. Also, according to the conditions described above, this embodiment is applicable only when adjacent information track grooves have a pitch smaller than 0.33 μm. Thus, the generalized application condition is $$U > 0.44 \qquad (4)$$

It should be noted that if U is smaller than 0.44, then it is the application range of the prior art described above.

As described above, according to this embodiment, by detecting the TE signal from a range that is narrower than the width of the areas, where the zero-order and first-order components of the diffracted light coming from the information track are superposed one upon the other, as measured along the information track, the tracking error due to the tilt of the optical disc can be reduced.

In the embodiment described above, the position signal detecting section 208 is provided. However, in an optical disc drive in which the shift of the objective lens can be sufficiently reduced to ±0.05 mm or less, for example, the same effects are also achieved even if the position signal detecting section 208 is omitted from the drive.

Embodiment 2

As a second embodiment of the present invention, an optical disc satisfying the inequality $$0.40 < \lambda/(T \cdot NA) - 1 < 0.46 \qquad (5)$$

where $\lambda$ is the wavelength of light, NA is the numerical aperture of an optical head for reading and/or writing data from/on the optical disc and T is the period of information track grooves, will be considered.

In reading and/or writing data from/on such an optical disc, the optical head operates just as already described for the first embodiment, and the description thereof will be omitted herein. Instead, it will be described here why such an optical disc can minimize the deviation of the TE signal due to its own tilt.

If the boundary condition (inequality (4)) as described for the first embodiment is modified into $$U = 0.44 \qquad (6)$$

then this is the condition on which the waveform 17 shown in FIG. 15 was calculated. As described above, in that case, almost no deviation is caused in the TE signal due to the tilt of the optical disc 105 even by the conventional TE signal generating method. Accordingly, an optical disc 105 substantially satisfying U=0.44 is preferably made. For example, supposing the wavelength is 405 nm and NA is 0.85, an optical disc, of which the information track pitch is defined somewhere between 0.326 μm and 0.340 μm, can satisfy this condition.

The waveform 13 shown in FIG. 14 represents a situation where the information track pitch T is 0.32 μm. On the other hand, the waveform 16 shown in FIG. 15 represents a situation where the information track pitch T is 0.35 μm. The tilt of the optical disc is supposed to be 0.6 degrees in both cases. The deviations of the TE signal as represented by these waveforms are far from being sufficiently small and are preferably cut down to half or less. If T=0.32 μm, U is 0.49. On the other hand, if T=0.35 μm, U is 0.36. Thus, the conditions represented by inequality (5) were obtained by adopting intermediate values between the best U value of 0.44 represented by Equation (6) and these two U values. Those conditions substantially satisfy Equation (6).

As described above, even if the optical disc of this embodiment has a tilt of about 0.6 degrees, which is allowed for a normal optical disc, the optical disc can still reduce the deviation of the TE signal due to that tilt to a substantially negligible level.

Embodiment 3

An optical head according to a third embodiment of the present invention is different from the optical head of the first embodiment only in the method of splitting the luminous flux by the light splitting means (i.e., diffraction element). Thus, the following description will be focused on this difference.

Figure 16:
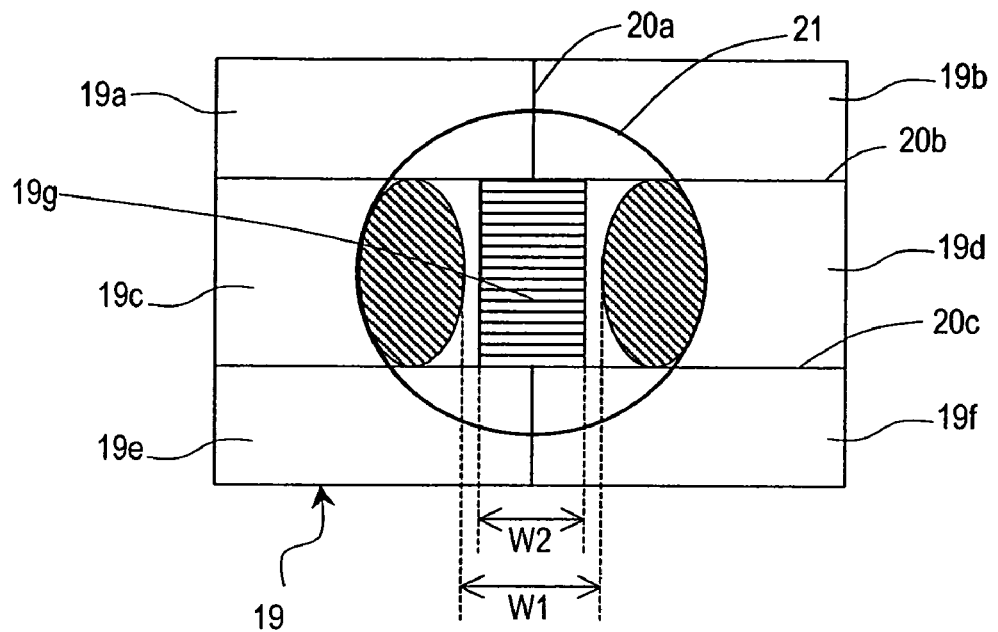
FIG. 16 shows a diffraction element 19 according to a third embodiment.

FIG. 16 shows a diffraction element 19 according to this third embodiment. An optical head according to this embodiment can be obtained by substituting this diffraction element 19 for the diffraction element 206 shown in FIG. 12. The diffraction element 19 splits the luminous flux by areas 19a through 19g, which are defined by division lines 20a, 20b and 20c. FIG. 16 shows the beam spot shape 21 of the luminous flux that has entered this diffraction element 19.

The respective areas for the split luminous flux will be further described. The four areas 19a, 19b, 19e and 19f are areas through which light rays for detecting the objective lens position signal pass. The two areas 19c and 19d pass the light rays for detecting the TE signal. The area 19g with horizontal hatching may be a diffraction element for diffracting the light ray and is designed such that even the reflected light ray that has entered this area 19g will not reach an area of the light receiving section 207 for generating the TE signal. The areas with oblique hatching represent the areas where the zero-order and first-order components of the diffracted light coming from the information track are superposed one upon the other.

Hereinafter, the relationship between the widths W1 and W2 of the areas shown in FIG. 16 will be described. More specifically, the width W1 represents the gap between the areas where the two types of components of the diffracted light coming from the information track are superposed one upon the other. On the other hand, the width W2 corresponds to the width of the area where no TE signal should be detected. The light rays that have been split to the respective detecting areas 19a through 19f are then guided to, and received at, the light receiving section 207. For example, if a signal that has passed through any area of the diffraction element 19 shown in FIG. 16 and then detected at its associated light receiving area of the light receiving section 207 is identified by the reference numeral given to that area of the diffraction element 19, then the corrected TE signal is given by $$TE = (19c - 19d) - k(19a + 19e - 19b - 19f) \qquad (7)$$

where k is the offset correction factor.

The first term of Equation (7) is the uncorrected TE signal (i.e., push-pull signal) and the second term, multiplied by the offset correction factor k, is the objective lens position signal.

One of the features of this embodiment is to provide the TE signal non-detecting area 19g approximately at the center of the incoming luminous flux and between the two areas where the zero-order and first-order components of the diffracted light coming from the information track are superposed one upon the other. Thus, the offset to be produced in the TE signal when adjacent information tracks have mutually different reflectances can be reduced.

Figure 9:
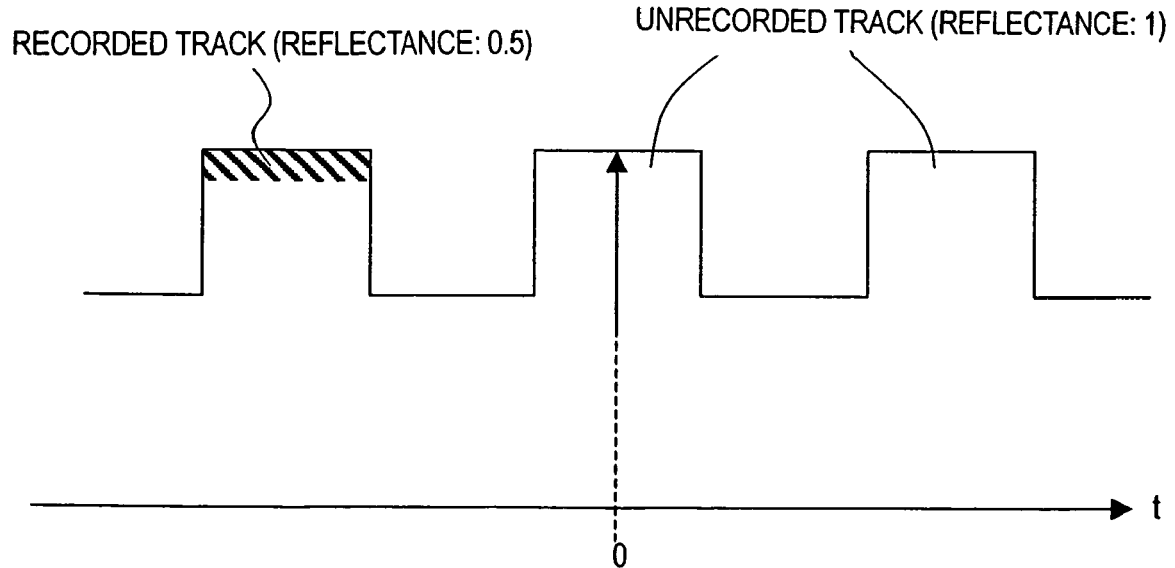
FIG. 9 is a cross-sectional view of three information tracks.
Figure 10:
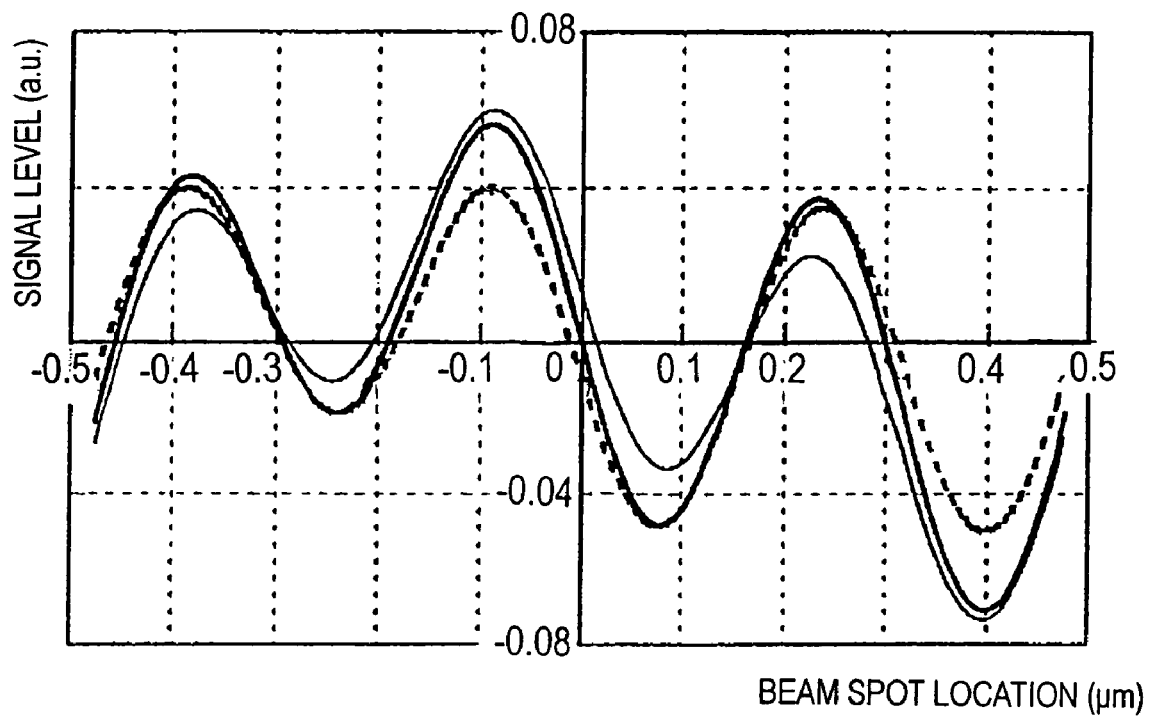
FIG. 10(a) is a graph showing the waveforms of push-pull signals of which the offsets are not corrected.
FIG. 10(b) is a graph showing the waveforms of tracking error signals of which the offsets are corrected.
Figure 10:
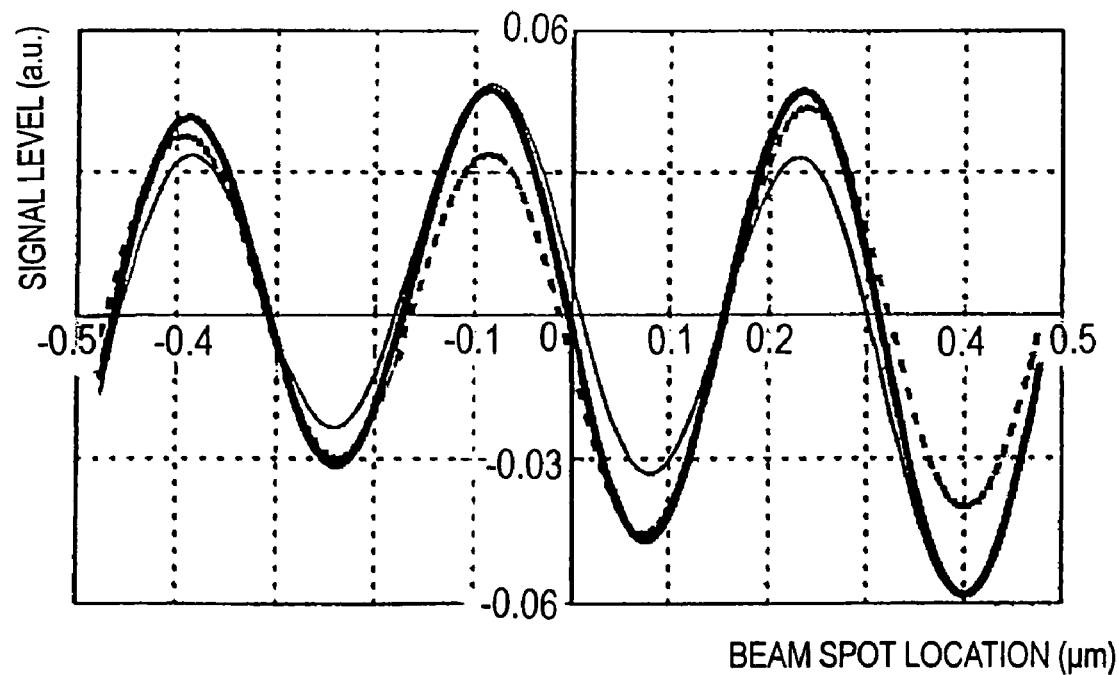
Figure 17:
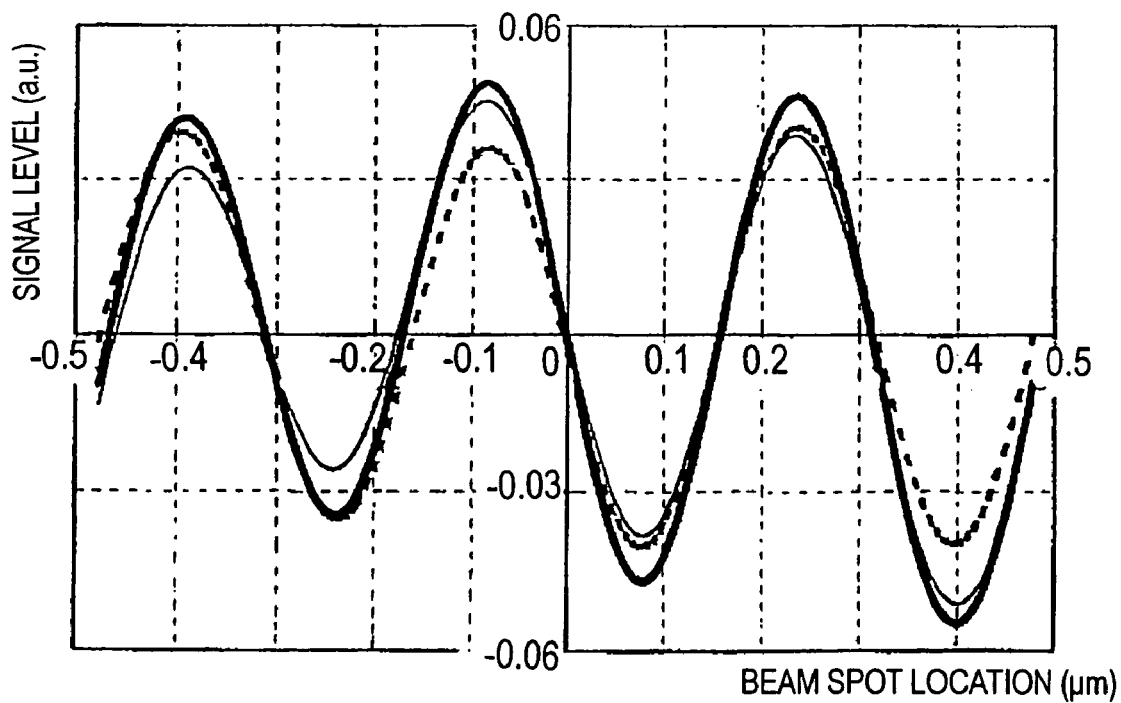
FIG. 17 is a graph showing the waveforms of TE signals obtained from information tracks with different reflectances.

Hereinafter, the features of this embodiment will be described in further detail. FIG. 17 shows the waveforms of TE signals obtained from multiple information tracks with different reflectances. In this case, the ratio of the width W2 of the TE signal non-detecting area 19g to the diameter of the luminous flux 20 is supposed to be 0.36. The other calculation conditions are identical with those already described with reference to FIG. 10. The information tracks with different reflectances are shown in FIG. 9, for example.

Among the three waveforms shown in FIG. 17, the bold curve represents a signal waveform at the focal point of the beam spot, the solid curve represents a waveform when the focal point of the beam spot is shifted by +0.2 μm, and the dashed curve represents a waveform when the focal point of the beam spot is shifted by −0.2 μm. Compared with the waveforms shown in FIG. 10(b), the respective waveforms shown in FIG. 17 have much closer zero-crossing points in the vicinity of the respective centers of the information tracks (i.e., at the location of 0 μm and the locations of ±0.32 μm on the axis of abscissas). Thus, the deviation of the TE signal has been significantly reduced with respect to any focus shifting.

Next, it will be described why the deviation of the TE signal could be reduced. If a beam spot crosses multiple information tracks with various reflectances, then a diffraction pattern, representing not only the periodicity of any information track but also the periodicity of that reflectance variation, will appear in the cross section of the luminous flux reflected from the optical disc. Supposing one of the three information tracks has a lower reflectance as shown in FIG. 9, the period of the fundamental wave representing the reflectance variation will be three times as long as the information track pitch and the second- and third-order components of the Fourier series will be 1.5 times as long as, and 1.0 time as long as, the information track pitch, respectively. Diffracted light that has come from a structure with a period greater than the information track pitch has a small diffraction angle. In that case, the diffracted light will appear at the center of the luminous flux, too. However, by using the diffraction element 19 of this embodiment, the TE signal is generated with the center portion of the luminous flux filtered out through the area 19g. Accordingly, even if the intensity distribution has varied in that center portion, its effect is much smaller than the situation where the TE signal is generated with that center portion of the luminous flux used. Consequently, the deviation of the TE signal can be reduced without varying the offset of the TE signal.

It should be noted that the widths W1 and W2 of the areas shown in FIG. 16 preferably satisfy the inequality W1>W2. This is because if W1≦W2, then the light rays represented by the oblique hatching in FIG. 16 would overlap with the TE signal non-detecting area 19g. In that case, if the TE signal were detected based on the variation in intensity distribution of those hatched areas, then the resultant accuracy would decrease. Particularly if the diffraction element 19 is fixed to the optical head, the luminous flux shifts as the objective lens 204 is moved. As a result, the light rays in the hatched areas further expand toward the TE signal non-detecting area 19g, thus making the TE signal even less accurate.

According to the embodiment described above, by providing the TE signal non-detecting area at the center of the luminous flux, the offset to be produced in the TE signal on the boundary between multiple information tracks with mutually different reflectances can be reduced.

Embodiment 4

An optical head according to a fourth embodiment of the present invention is different from the optical head of the first embodiment only in the method of splitting the luminous flux by the light splitting means (i.e., diffraction element). Thus, the following description will be focused on this difference.

Figure 18:
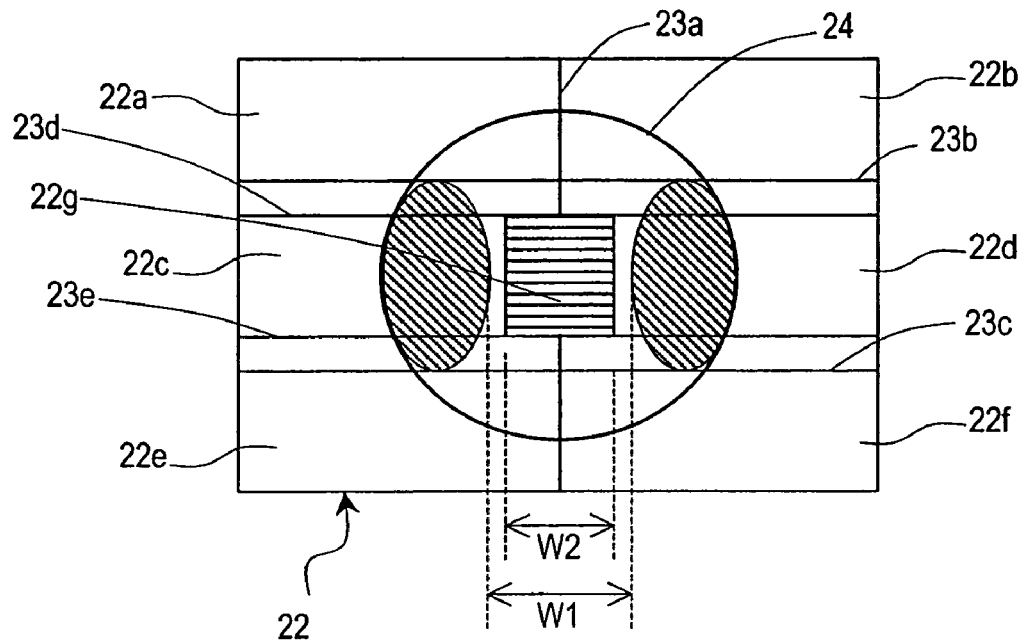
FIG. 18 shows a diffraction element 22 according to a fourth embodiment.

FIG. 18 shows a diffraction element 22 according to this fourth embodiment. An optical head according to this embodiment can be obtained by substituting this diffraction element 22 for the diffraction element 206 shown in FIG. 12. The diffraction element 22 splits the respective light rays to areas 22a through 22g, which are defined by division lines 23a through 23e. FIG. 18 shows the beam spot shape 24 of the luminous flux that has entered this diffraction element 19.

The respective areas for the split luminous flux will be further described. The four areas 22a, 22b, 22e and 22f pass through the light rays which are used for detecting the objective lens position signal. The two areas 22c and 22d pass the light rays for detecting the TE signal. The area 22g with horizontal hatching may be a diffraction element for diffracting the light ray and is designed such that even the reflected light ray that has entered this area 22g will not reach an area of the light receiving section 207 for generating the TE signal.

Furthermore, the area between the areas 22a and 22c, the area between the areas 22b and 22d, the area between the areas 22c and 22e, and the area between the areas 22d and 22f are opaque areas that are designed so as not to guide the incoming light to the light receiving section 207. These areas are provided so as to prevent the light entering these areas from being used to detect the TE signal or objective lens position signal. As long as this object is achieved, the diffraction element 22 may adopt a different configuration. For example, a diffraction grating may be provided in these areas to prevent the light from being guided to the light receiving areas of the light receiving section 207. Alternatively, no features may be provided for these areas but instead the light receiving areas may be selectively removed from the light receiving section 207 on which the light rays, having passed through these areas, will be incident.

Also, in FIG. 18, the areas with oblique hatching represent the areas where the zero-order and first-order components of the diffracted light coming from the information track are superposed one upon the other. Furthermore, in FIG. 18, W1 represents the gap between the areas where the two types of components of the diffracted light coming from the information track are superposed one upon the other. On the other hand, W2 represents the width of the TE signal non-detecting area 22g. The light rays that have been split to the respective detecting areas 22a through 22f are then guided to, and received at, the light receiving section 207. For example, if a signal that has passed through any area of the diffraction element 22 shown in FIG. 18 and then detected at its associated light receiving area of the light receiving section 207 is identified by the reference numeral given to that area of the diffraction element 22, then the corrected TE signal is given by $$TE=(22c-22d)-k(22a+22e-22b-22f) \qquad (8)$$

where k is the offset correction factor.

The first term of Equation (8) is the uncorrected TE signal (i.e., push-pull signal) and the second term, multiplied by the offset correction factor k, is the objective lens position signal.

One of the features of this embodiment is to set the width of the TE signal generating areas 22c and 22d along the information tracks (i.e., as measured along the division line 23a) shorter than that of the obliquely hatched areas in the same direction and to provide the TE signal non-detecting area 22g approximately at the center of the incoming luminous flux. Thus, both the deviation of the TE signal due to the tilt of the optical disc and the offset to be produced in the TE signal on the boundary between information tracks with mutually different reflectances can be reduced at the same time. This is because the diffraction element 22 of this embodiment includes not only areas corresponding to the areas Rac, Rbd, Rce and Rdf of the diffraction grating 206 of the first embodiment but also an area 22g corresponding to the TE signal non-detecting area 19g of the diffraction element 19 of the third embodiment. Hereinafter, it will be described how these two effects are achieved at the same time even if those two configurations are combined.

Figure 19:
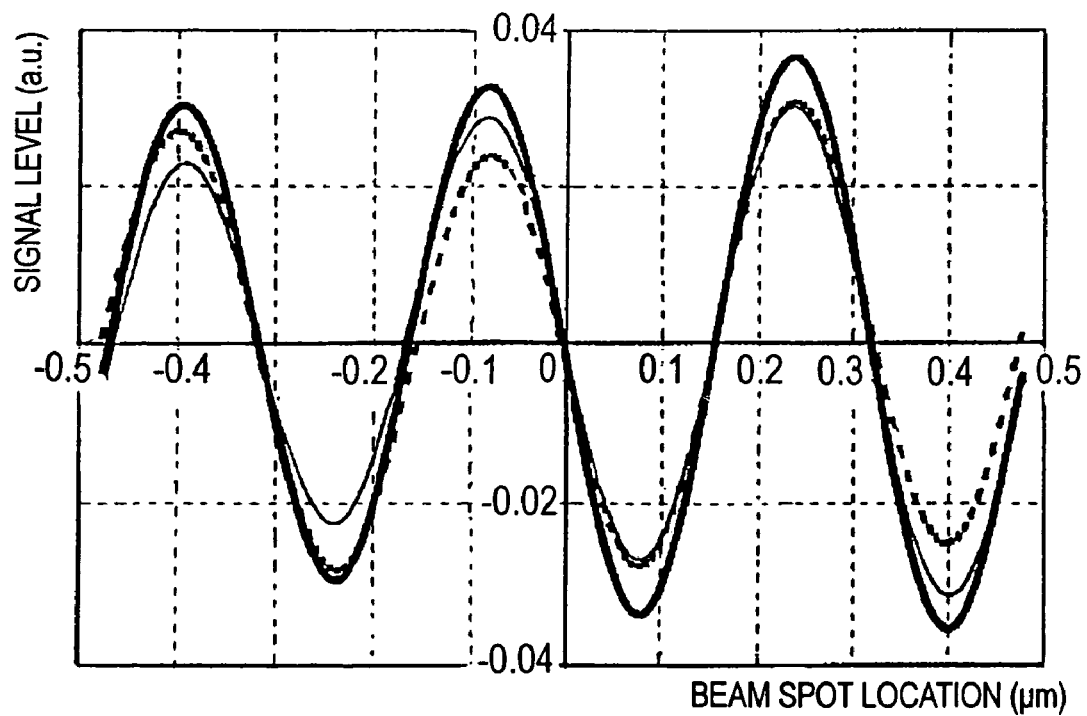
FIG. 19 is a graph showing the waveforms of a TE signal obtained by using the diffraction grating 22 of the fourth embodiment.

First, the effect of reducing the deviation of the TE signal due to the tilt of the optical disc is determined by the ratio of the width of the TE signal detecting areas to that of the obliquely hatched areas shown in FIG. 18. Accordingly, even if the area 22g, not including the obliquely hatched areas, is provided, that effect can be clearly maintained. Next, it will be considered how the TE signal changes when the width of the areas 22c and 22d is decreased along the division line 23a and if the area 22g is further provided. FIG. 19 shows the waveforms of TE signals obtained by using the diffraction grating 22 of this embodiment. The calculations were done under the same conditions as FIG. 17 except that the ratio of the gap between the division lines 23d and 23e to the diameter of the luminous flux and the ratio of the width W2 to the diameter of the luminous flux were both 0.36. These waveforms exhibit good characteristics in which the zero-crossing points hardly shifted due to the focus shifting in the vicinity of the respective centers of information tracks. That is to say, even if the areas corresponding to the areas Rac, Rbd, Rce and Rdf of the diffraction grating 206 of the first embodiment and the area 22g corresponding to the TE signal non-detecting area 19g of the diffraction grating 19 of the third embodiment are provided in combination, the effects of the respective diffraction gratings of these two embodiments can be achieved at the same time.

Thus, according to this embodiment, the deviation of the TE signal due to the tilt of the optical disc 105 and the offset to be produced in the TE signal on the boundary between the information tracks with different reflectances can be both reduced.

Embodiment 5

Figure 20:
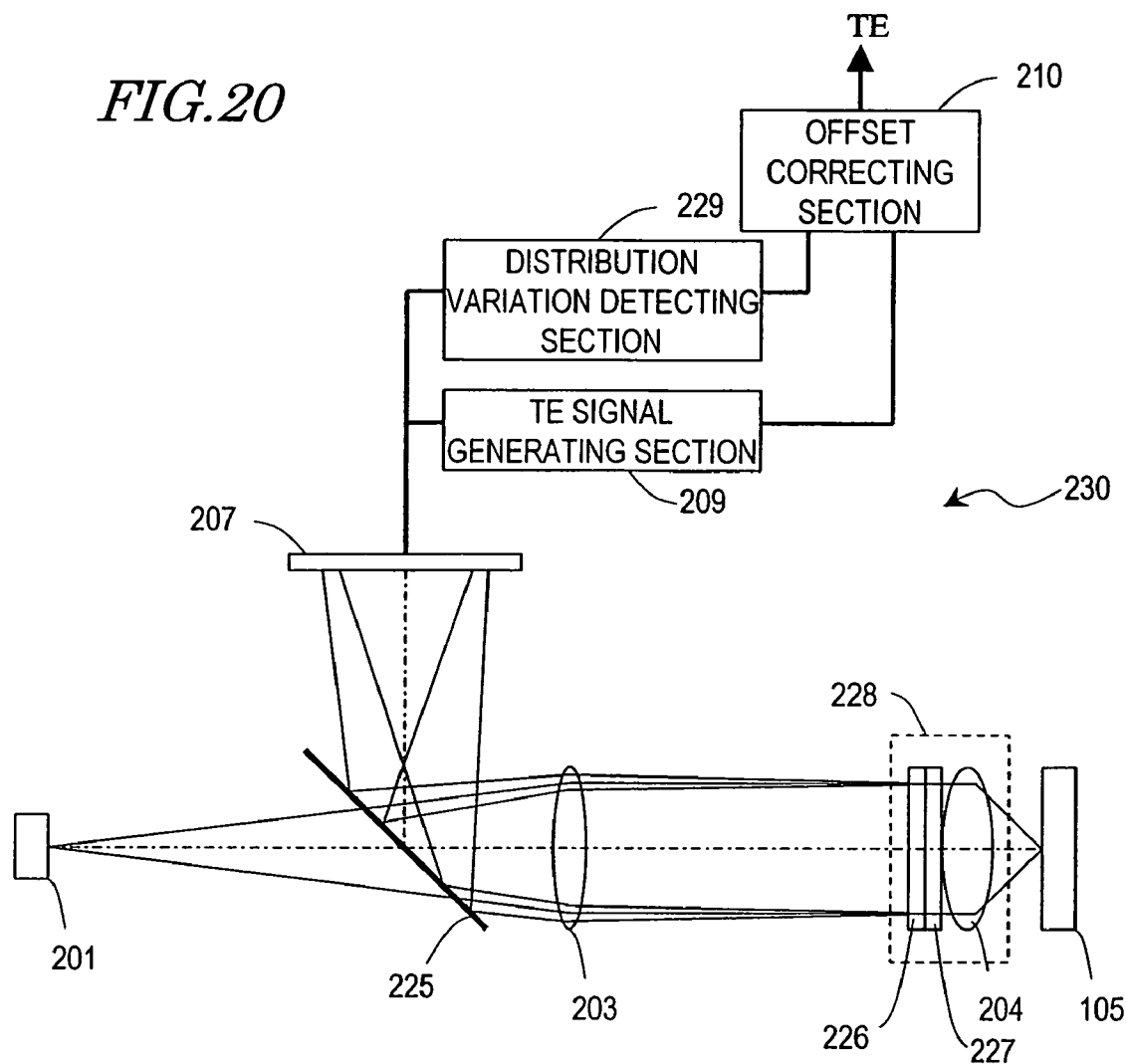
FIG. 20 shows a configuration for an optical head 230 according to a fifth embodiment.

FIG. 20 shows a configuration for an optical head 230 according to a fifth embodiment of the present invention. The optical head 230 includes the light source 201, a polarization beam splitter 225, the collimator lens 203, a polarizing diffraction element 226, a quarter-wave plate 227, the objective lens 204, a holder 228, the TE signal generating section 209, the offset correcting section 210 and a distribution variation detecting section 229. In the optical head 230 of this embodiment, any component having the same function as the counterpart of the optical head 220 of the first embodiment is identified by the same reference numeral and the description thereof will be omitted herein.

The polarizing diffraction element 226 is a diffraction element, of which the diffraction efficiency changes with the polarization direction, and functions as the light splitting means. The holder 228 holds the polarizing diffraction element 226, quarter-wave plate 27 and objective lens 4 together. The distribution variation detecting section 229 detects a variation in the light intensity distribution of the luminous flux that has been reflected from the optical disc 105.

The light radiated from the light source 201 is incident as a P-polarized light ray onto the polarization beam splitter 225 and transmitted through the splitter 225. Next, the light is transformed by the collimator lens 203 into a luminous flux of parallel rays, which is incident onto, and transmitted as it is through, the polarizing diffraction element 226 so as to enter the quarter-wave plate 227. Thereafter, the light that has passed through the quarter-wave plate 227 is transformed into a circularly polarized light ray, which is incident on, and focused on the information storage layer of the optical disc 105 by, the objective lens 204.

The light that has been reflected from the optical disc 105 passes through the objective lens 204 again and enters the quarter-wave plate 227. After having passed through the quarter-wave plate 227, the light is transformed into linearly polarized light, of which the polarization direction is perpendicular to that of the P-polarized accessing light and which enters the polarizing diffraction element 226 next. The light that has entered the polarizing diffraction element 226 is diffracted this time almost entirely because its polarization direction is perpendicular to that of the accessing polarized light. The light is split by the polarizing diffraction element 226 into multiple light rays, which are then incident onto the polarization beam splitter 225 by way of the collimator lens 203. These polarized light rays are S-polarized, and therefore, are all reflected toward the light receiving section 207.

The light rays, which have been produced by getting the polarized light split by the polarizing diffraction element 226, are detected at the light receiving section 207 and then supplied as signal for generating a TE signal to the TE signal generating section 209. On the other hand, another signal, which has been divided by the polarizing diffraction element 226 and detected at the light receiving section 207 so as to be used for detecting a light intensity distribution variation signal, is supplied to the light intensity distribution variation signal detecting section 229.

The two signals, detected by these TE signal generating section 209 and distribution variation signal detecting section 229, are both supplied to the offset correcting section 210. The offset correcting section 210 defines the correction factor so as to reduce the offset to be produced in the TE signal due to a variation in the light intensity distribution of the detected luminous flux (i.e., the luminous flux that has been reflected from the optical disc and incident on the polarizing diffraction element 226). By performing predetermined computation processing, the offset correcting section 210 generates an offset-corrected TE signal. By using this offset-corrected TE signal, a tracking control operation is carried out. The polarizing diffraction element 226 may split the luminous flux by the same method as the diffraction element 206 shown in FIG. 13. For example, referring to FIG. 13, the four areas 6a, 6b, 6e and 6f may be used as areas to pass the light rays for detecting a variation in the light intensity distribution of the luminous flux, while the two areas 6c and 6d may be used as areas to pass the light rays for detecting the TE signal.

In this embodiment, the objective lens 4 and the polarizing diffraction element 226 functioning as the light splitting means are held together by the holder 228. Accordingly, even during the tracking control operation, these members 204 and 226 are arranged so as to move together. In this arrangement, even if the objective lens 204 has shifted, the location of the detected luminous flux never changes with respect to the polarizing diffraction element 226. Thus, by using the light rays that have passed through the areas 6a through 6f, the variation in information track pitch and the variation in the light intensity distribution of the detected luminous flux on the boundary between information tracks with different reflectances can be detected. Accordingly, the offset correction factor can be defined so as to correct the variation in information track pitch and the variation in offset on the boundary between information tracks with different reflectances without taking the offset of the TE signal due to the shift of the objective lens into account. Consequently, the tracking error caused by these factors can be further reduced.

Also, if the polarizing diffraction element 226 splits the reflected light as shown in FIG. 16, the location of the detected luminous flux never moves, and the width W2 of the TE signal non-detecting area 19g can be substantially equalized with the width W1 shown in FIG. 16. Then, more factors causing the offset variation due to the focus shifting on the boundary between information tracks with different reflectances can be eliminated and the resultant offset in the TE signal can be further reduced.

Thus, according to the embodiment described above, by arranging the light splitting means to move together with the objective lens and by making the light splitting means split the light just like the counterpart of the third or fourth embodiment described above, the offset correction factor can be defined with a higher priority given to reducing the variation in information track pitch and the offset variation to be produced in the TE signal when adjacent information tracks have mutually different reflectances. Consequently; the resultant offset of the TE signal can be further reduced.

Embodiment 6

Figure 21:
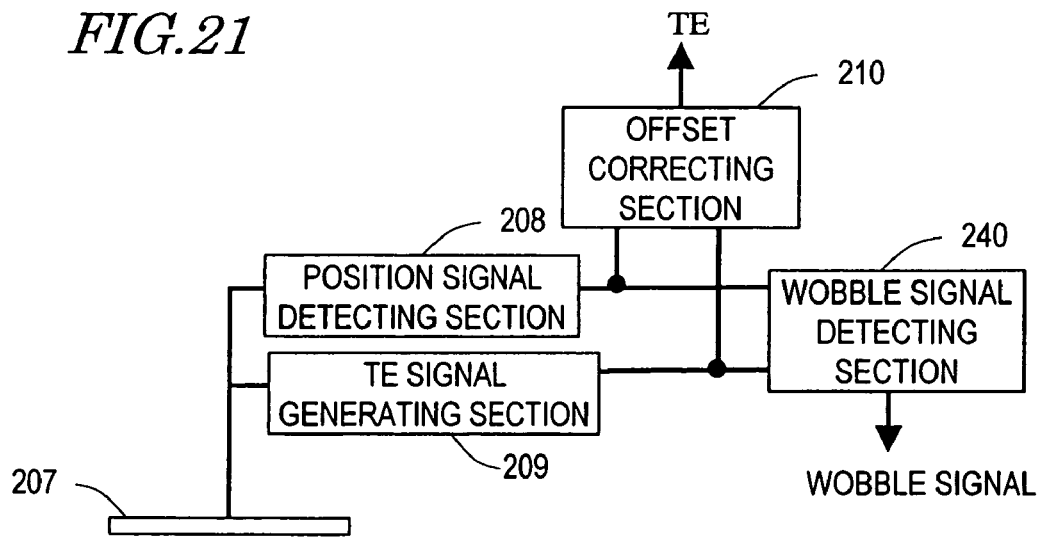
FIG. 21 shows a configuration for an optical head according to a sixth embodiment.

FIG. 21 shows a configuration for an optical head according to a sixth embodiment of the present invention. The optical head of this embodiment is obtained by adding a wobble signal detecting section 240 to the optical head 220 (see FIG. 12) of the first embodiment described above. Thus, the following description will be focused on the configuration and operation involved with the wobble signal detecting section 240. The other configuration and operation are the same as those of the optical head 220 of the first embodiment and the description thereof will be omitted herein.

First, it will be described what signals pass where before a wobble signal is detected. In FIG. 21, the respective light quantity signals, detected by the light receiving section 207, are passed to the position signal detecting section 208 and TE signal generating section 209. The position signal detecting section 208 detects the objective lens position signal, while the TE signal generating section 209 detects the TE signal. Next, these two signals are supplied to the offset correcting section 210 and subjected to a predetermined computation using an offset correction factor k1, thereby obtaining a corrected TE signal. Following the notation of the first embodiment, the TE signal is given by $$TE = 6c - 6d - k1(6a + 6e - 6b - 6f) \quad (9)$$

The objective lens position signal and TE signal are also passed from the position signal detecting section 208 and TE signal generating section 9 to the wobble signal detecting section. These two signals, introduced to the wobble signal detecting section 240, are subjected to a predetermined computation using another correction coefficient k2, thereby obtaining a wobble signal WTE. The address information and other identification information are detected using this wobble signal WTE. Following the notation of the first embodiment again, the wobble signal WTE is given by $$WTE = (6c - 6d) - k2(6a + 6e - 6b - 6f) \quad (10)$$

In this case, the offset correction factor k1 is defined so as to minimize the offset of the TE signal waveform due to the shift of the objective lens 204 by monitoring the waveform of the TE signal generated when the beam spot crosses the information tracks while no tracking control is being carried out. On the other hand, the offset correction factor k2 is defined so as to minimize the wobble signal offset variation (i.e., an envelope variation at lower frequencies than the wobble signal frequency) to be observed in the wobble signal WTE while the tracking control is being carried out.

Figure 1:
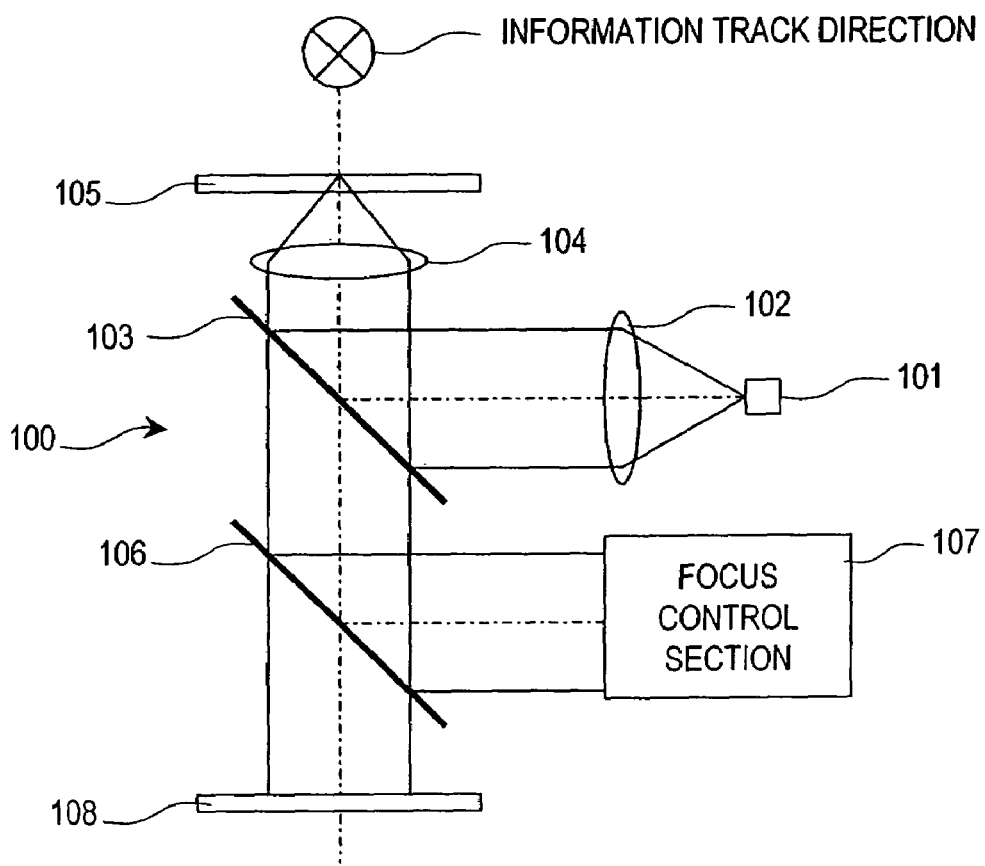
FIG. 1(a) shows a configuration for a conventional optical head 100 and FIG. 1(b) shows the cross section of a luminous flux received at the light receiving section 108 thereof.
Figure 1:
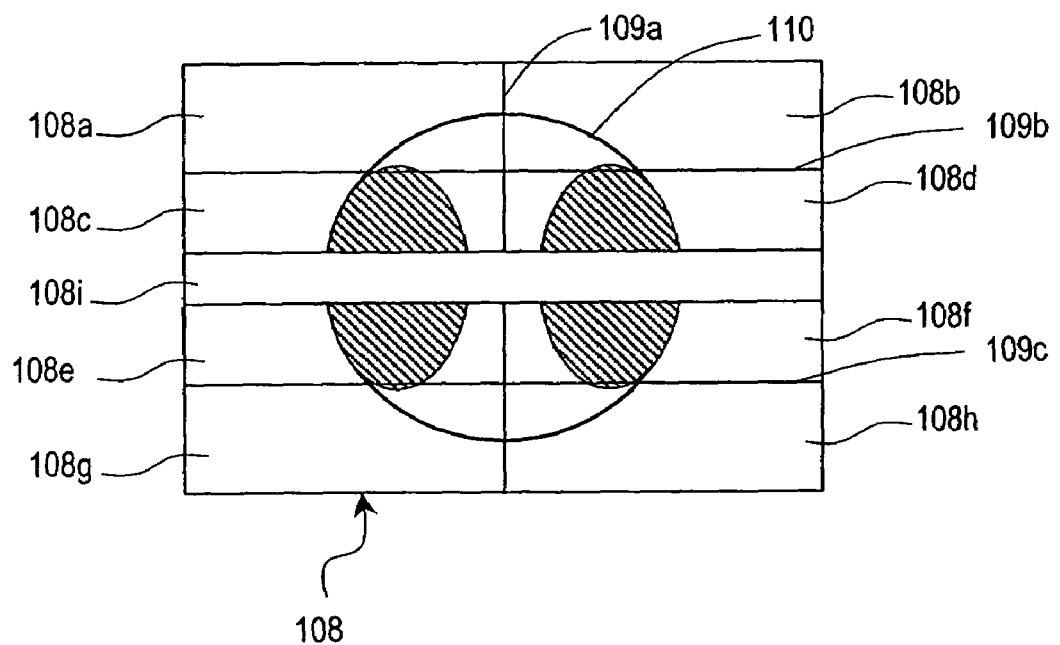
Figure 2:
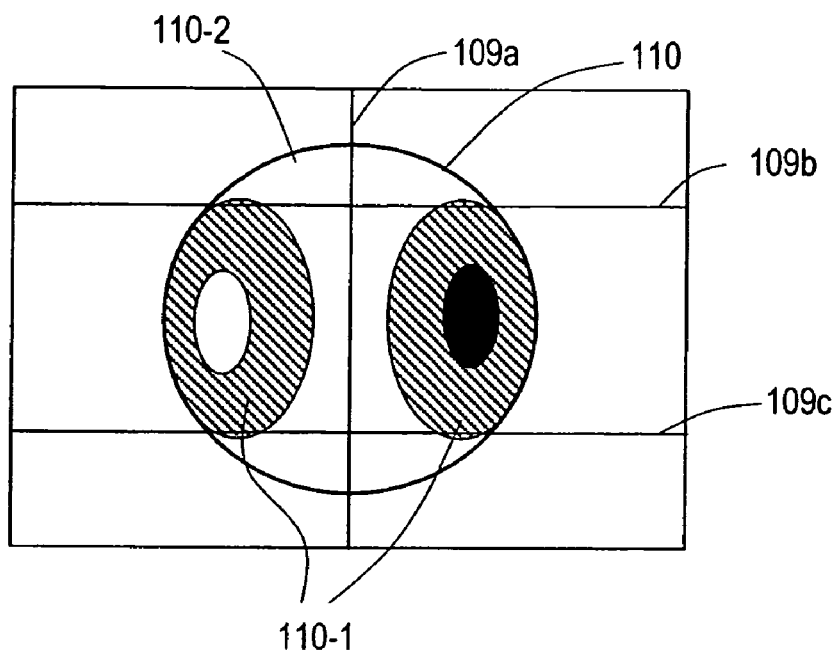
FIG. 2 schematically shows the light intensity distribution of a luminous flux 110 that has been reflected from a tilted optical disc 105.
Figure 3:
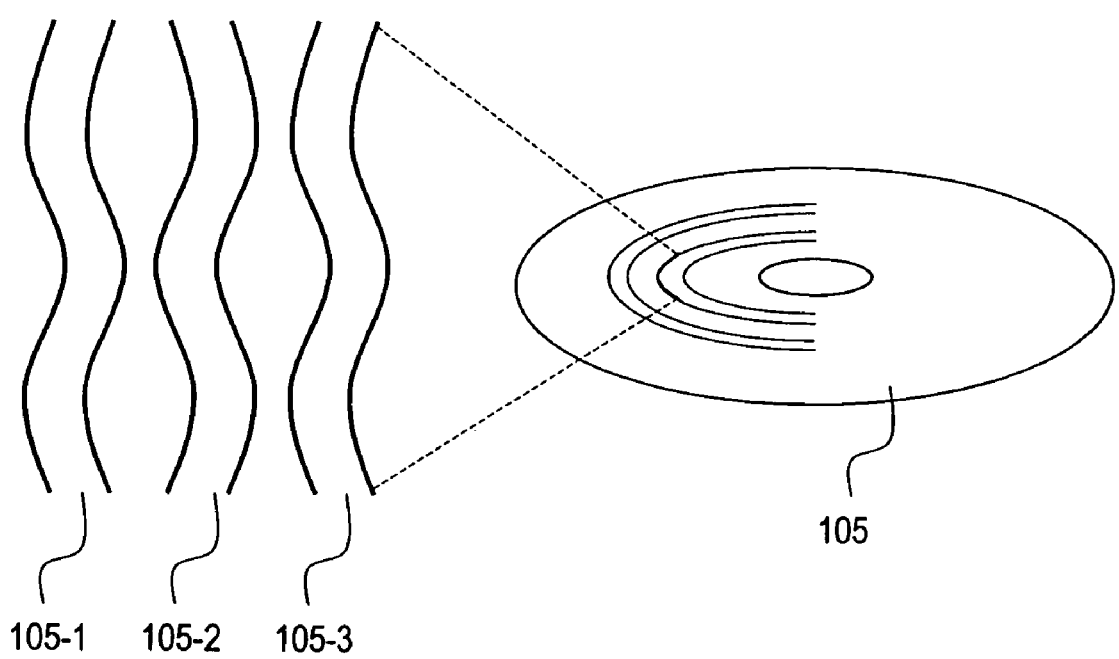
FIG. 3 is a partial enlarged view of wobbled information tracks 105-1 through 105-3 on the optical disc 105.
Figure 4:
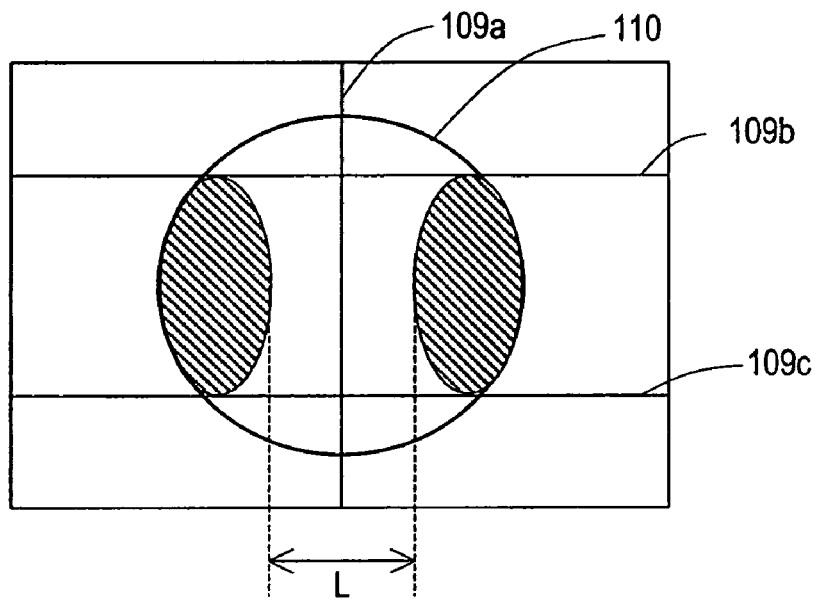
FIG. 4 schematically shows the light intensity distribution of a luminous flux that has been reflected from a high-density optical disc.
Figure 5:
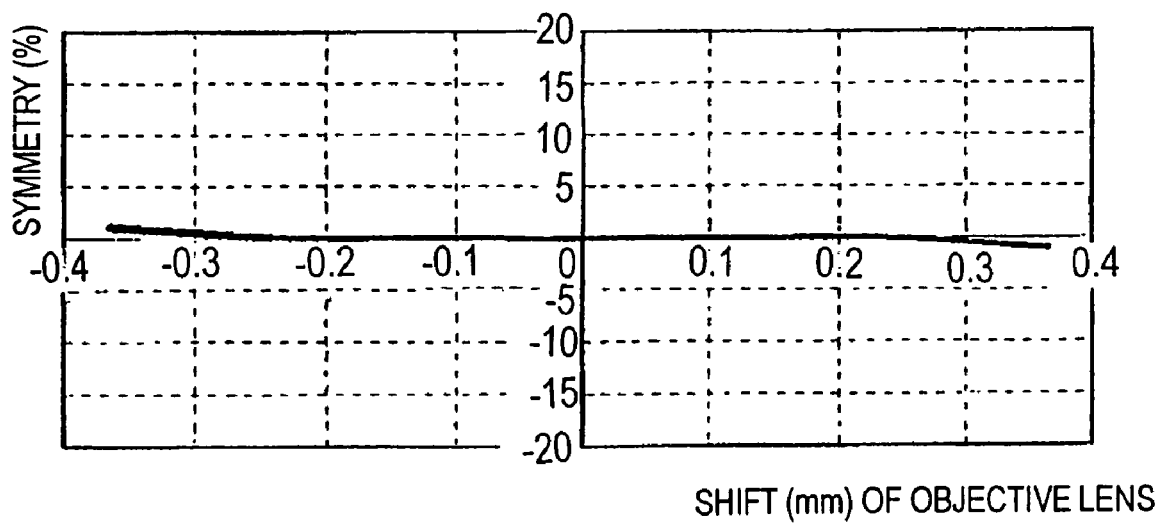
FIG. 5 is a graph showing a relationship between the shift of an objective lens 104 and the symmetry of a tracking error signal.
Figure 6:
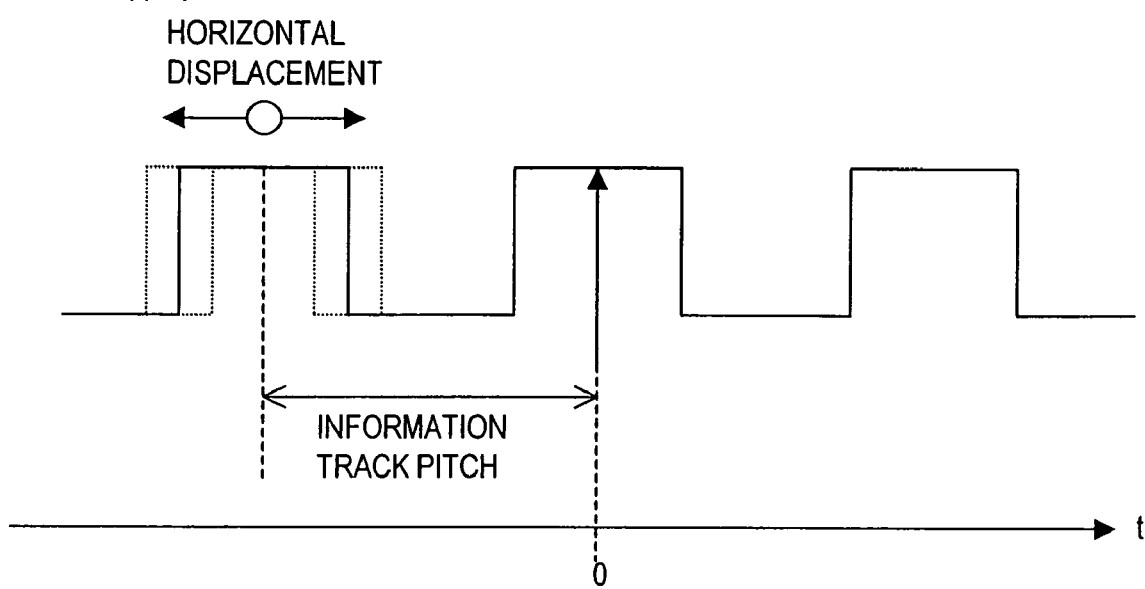
FIG. 6 shows a model on which the leftmost one of three information tracks may be displaced.
Figure 7:
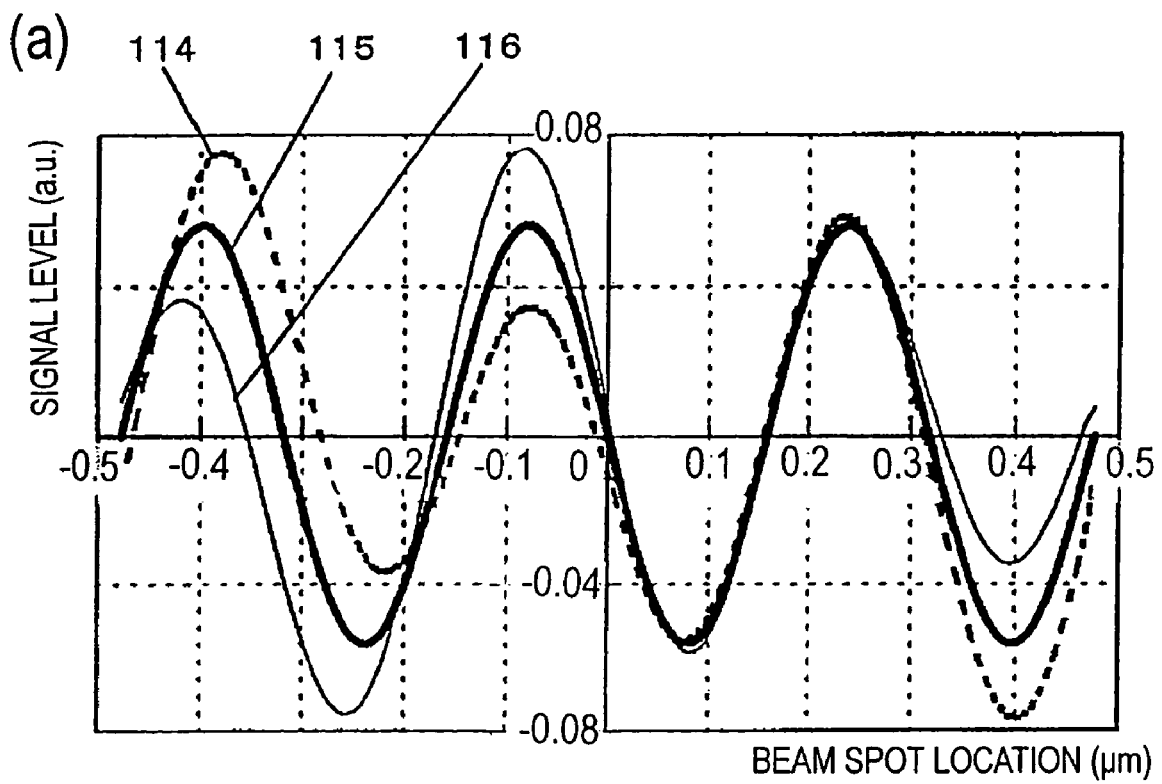
FIGS. 7(a) and 7(b) show the waveforms of tracking error signals obtained by displacing the leftmost information track.
Figure 7:
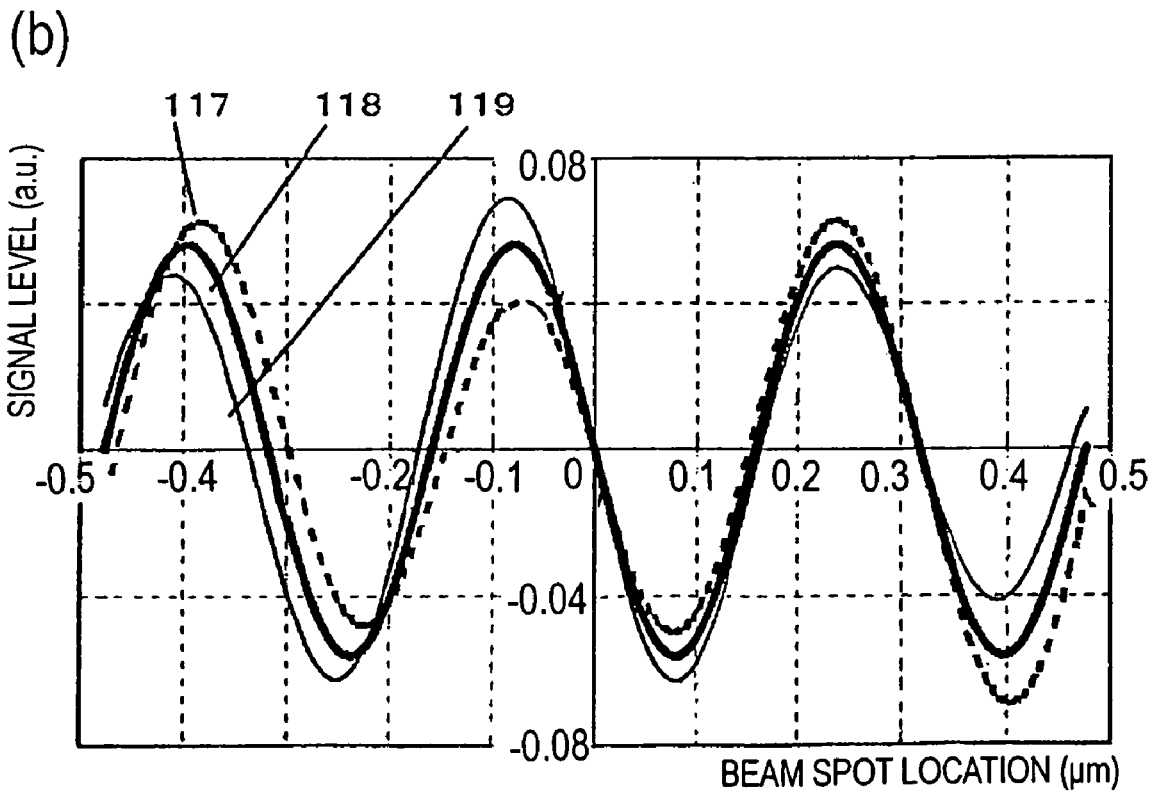
Figure 8:
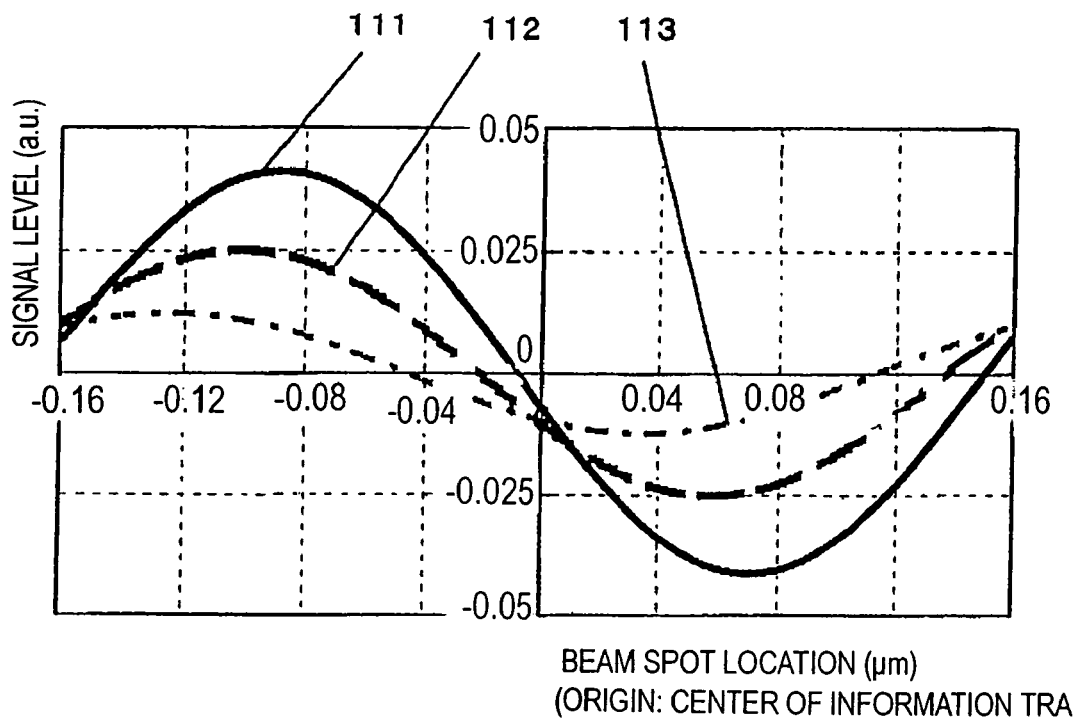
FIG. 8 is a graph showing how the waveform of a tracking error signal changes when the width of an light shielding area 108i is changed in the direction in which the division line 109a (see FIG. 1(b)) extends.

The features of the wobble signal WTE that has been corrected with the objective lens position signal will be described with reference to FIG. 7(b). According to the graph shown in FIG. 7(b), even if adjacent information tracks are displaced by about ±0.02 μm in the vicinity of the location of −0.32 μm, the three waveforms 117, 118 and 119 still intersect each other at the origin and in the vicinity of the location of +0.32 μm and no variation is observed in the TE signal. That is to say, the wobble signal WTE represented by Equation (10) is unlikely to be affected by the displacements of adjacent information tracks. The wobble signal of an adjacent information track represents the displacement of an information track that is adjacent to a given information track. Accordingly, if a wobble signal is unlikely to be affected by the displacement, then the wobble signal should cause little crosstalk. Also, the crosstalk of the wobble signal appears as the offset variation of the wobble signal being monitored. Thus, to reduce the crosstalk, it is very effective to define the offset correction factor k2 so as to minimize the offset variation.

Thus, according to this embodiment, the crosstalk of the wobble signal can be reduced, and therefore, an address can be detected accurately enough even from a high-density optical disc with a narrow information track groove pitch.

The optical head of this embodiment is supposed to use the configuration of the optical head of the first embodiment. However, the present invention is in no way limited to this specific embodiment. Instead, this embodiment is also applicable to the optical head of the third, fourth or fifth embodiment described above or even to the conventional optical head described above. Furthermore, this embodiment is applicable for use in any other optical head as long as the optical head has means for detecting the objective lens position signal or light intensity distribution variation signal by splitting a given luminous flux to multiple surrounding areas along the information tracks.

In the foregoing description, the light transmitting and cut-off areas shown in FIG. 13, 16 or 18 are supposed to belong to a diffraction element. Alternatively, those areas illustrated in any of these drawings may also be seen as illustrating light receiving areas and non-receiving areas of the light receiving section. This is because if there are light transmitting and cut-off areas in the diffraction element, then the light receiving section should have associated light receiving areas and non-receiving areas. Accordingly, the light receiving function or non-receiving function (i.e., function of not using the light received) as described with reference to FIGS. 13, 16 and 18 may be provided for respective areas of the light receiving section, not the diffraction element.

INDUSTRIAL APPLICABILITY

An optical head according to the present invention can reduce not only the deviation of a TE signal due to the tilt of a given optical disc but also an offset to be produced in the TE signal on the boundary between information tracks with different reflectances. Thus, an optical disc drive, including such an optical head, can perform a tracking control accurately enough on the information tracks of the given optical disc.

The invention claimed is:

1. An optical head for reading and/or writing data from/on a storage medium, the optical head comprising:
   a light source;
   an objective lens for focusing light, which has been emitted from the light source, onto a track of the storage medium;
   light receiving means including at least one light receiving area for receiving a luminous flux of reflected rays, which have been reflected from the storage medium, thereby outputting a light quantity signal representing quantity of light received; and
   tracking error signal generating means for generating a tracking error signal based on the light quantity signal,
   wherein the luminous flux of reflected rays includes a first type of reflected rays where zero-order and first-order components of the light diffracted by the track are superposed one upon the other and a second type of reflected ray consisting essentially of the zero-order components, and
   wherein the light receiving area receives both the first type of reflected rays and the second type of reflected rays, and
   wherein the light receiving area receives center sections of the first type of reflected rays, and
   wherein as measured in a first direction in which the first type of reflected rays are arranged, the light receiving area has a size that is equal to or greater than the diameter of the luminous flux of reflected rays, and
   wherein as measured in a second direction perpendicular to the first direction, the light receiving area is narrower than a width of the first type of reflected rays.

2. The optical head of claim 1, wherein if the light source radiates light with a wavelength $\lambda$, the objective lens has a numerical aperture NA and the track has a period T, the optical head reads and/or writes data from/on a storage medium that satisfies the inequality: $0.44 < \lambda/(NA \cdot T) - 1$.

3. The optical head of claim 2, further comprising:
   position signal detecting means for generating a position signal based on a light quantity signal representing a portion of the second type of reflected ray, which is not sandwiched between the reflected rays of the first type, the position signal representing a position of the objective lens in a direction perpendicular to the optical axis of light entering the objective lens; and
   offset correcting means for correcting an offset to be produced in the tracking error signal due to a shift of the objective lens by reference to the position signal.

4. The optical head of claim 1, wherein if the light source radiates light with a wavelength $\lambda$, the objective lens has a numerical aperture NA and the track has a period T, the optical head reads and/or writes data from/on a storage medium that satisfies the inequality: $0.40 < \lambda/(NA \cdot T) - 1 < 0.46$.

5. The optical head of claim 1, further comprising light splitting means for splitting the luminous flux of reflected rays into the first and second types of reflected rays.

6. The optical head of claim 5, further comprising:
   a holder for holding the light splitting means and the objective lens together; and
   variation detecting means for generating a variation signal, representing a variation in light intensity distribution of the luminous flux of reflected rays on a boundary between two or more tracks with mutually different reflectances, based on the light quantity signal,
   wherein the offset correcting means corrects the offset to be produced in the tracking error signal due to the variation in light intensity distribution by reference to the variation signal.

7. The optical head of claim 5, wherein the track of the storage medium has a wobble to store predetermined information thereon, and
   wherein the optical head further includes wobble signal detecting means for generating a wobble signal, representing the wobble, based on the light quantity signal by performing computation processing on the position signal and the tracking error signal with the position signal multiplied by a prescribed coefficient.

8. The optical head of claim 6, wherein the track of the storage medium has a wobble to store predetermined information thereon, and
   wherein the optical head further includes wobble signal detecting means for generating a wobble signal, representing the wobble, based on the light quantity signal by performing computation processing on the variation signal and the tracking error signal with the variation signal multiplied by a prescribed coefficient.

9. The optical head of claim 8, wherein the wobble signal detecting means sets the prescribed coefficient that reduces an offset variation of the wobble signal.

10. The optical head of claim 1, wherein the light receiving means further includes non-light-receiving areas, which are provided at both sides of the light receiving areas in the second direction so as not to receive the first type of reflected rays and the second type of reflected ray.

11. The optical head of claim 1, wherein the first direction is a direction perpendicular to the track, and
    the second direction is a direction parallel to the track.

12. An optical head for reading and/or writing data from/on a storage medium having at least two tracks with mutually different reflectances, the optical head comprising:
    a light source;
    an objective lens for focusing light, which has been emitted from the light source, onto one of the tracks of the storage medium;
    light receiving means including: a plurality of light receiving areas, which receive a first type of reflected rays where zero-order and first-order components of the light diffracted by the track are superposed one upon the other to generate a light quantity signal representing quantity of light of the first type of reflected rays; and a non-light-receiving area, which is provided between the light receiving areas so as not to receive a second type of reflected ray consisting essentially of the zero-order components; and
    tracking error signal generating means for generating a tracking error signal based on the light quantity signal,
    wherein as measured in a direction in which the first type of reflected rays are arranged, the non-light-receiving area is narrower than a shortest distance between the first type of reflected rays.

13. The optical head of claim 12, wherein the light receiving means further includes another light receiving area to generate a light quantity signal representing quantity of light of a portion of the second type of reflected ray, which is not sandwiched between the reflected rays of the first type, and
    wherein the optical head further includes:
    position signal detecting means for generating a position signal based on the light quantity signal representing the portion of the second type of reflected ray, the position signal representing a position of the objective lens in a direction perpendicular to the optical axis of light entering the objective lens; and offset correcting means for correcting an offset to be produced in the tracking error signal due to a shift of the objective lens by reference to the position signal.

14. The optical head of claim 12, wherein if the light source radiates light with a wavelength $\lambda$, the objective lens has a numerical aperture NA and the track has a period T, the optical head reads and/or writes data from/on a storage medium that satisfies the inequality: $0.44 < \lambda/(NA \cdot T) - 1$.

15. The optical head of claim 14, wherein as measured in a first direction in which the first type of reflected rays are arranged, each said light receiving area has a size that is equal to or greater than the diameter of the luminous flux of reflected rays, and wherein as measured in a second direction perpendicular to the first direction, the light receiving area is narrower than the first type of reflected rays.

16. The optical head of claim 13, further comprising light splitting means for splitting the luminous flux of reflected rays into the first and second types of reflected rays.

17. The optical head of claim 16, further comprising:

a holder for holding the light splitting means and the objective lens together; and variation detecting means for generating a variation signal, representing a variation in light intensity distribution of the luminous flux of reflected rays on a boundary between two or more tracks with mutually different reflectances, based on the light quantity signal, wherein the offset correcting means corrects the offset to be produced in the tracking error signal due to the variation in light intensity distribution by reference to the variation signal.

18. A drive for making an optical head, control signal generating means and driving means read and/or write data from/on a storage medium, the optical head comprising:

a light source;

an objective lens for focusing light, which has been emitted from the light source, onto a track of the storage medium;

light receiving means including at least one light receiving area for receiving a luminous flux of reflected rays, which have been reflected from the storage medium, thereby outputting a light quantity signal representing quantity of light received;

tracking error signal generating means for generating a tracking error signal based on the light quantity signal; and shifting means for changing a position of the lens parallel to the track responsive to a drive signal, wherein the luminous flux of reflected rays includes a first type of reflected rays where zero-order and first-order components of the light diffracted by the track are superposed one upon the other and a second type of reflected ray consisting essentially of the zero-order components, and wherein the light receiving area receives both the first type of reflected rays and the second type of reflected rays, and wherein the light receiving area receives center sections of the first type of reflected rays, and wherein as measured in a first direction in which the first type of reflected rays are arranged, the light receiving area has a size that is equal to or greater than the diameter of the luminous flux of reflected rays, and wherein as measured in a second direction perpendicular to the first direction, the light receiving area is narrower than a width of the first type of reflected rays, and wherein the control signal generating means generates a control signal for controlling the position of the lens such that the light follows the track on the storage medium in response to the tracking error signal, and wherein the driving means generates the drive signal for driving the shifting means in response to the control signal.

19. The drive of claim 18, wherein the light receiving means further includes non-light-receiving areas, which are provided at both sides of the light receiving areas in the second direction so as not to receive the first type of reflected rays and the second type of reflected ray.

20. The drive of claim 18, wherein the first direction is a direction perpendicular to the track, and the second direction is a direction parallel to the track.

21. A drive for making an optical head, control signal generating means and driving means read and/or write data from/on a storage medium having at least two tracks with mutually different reflectances, the optical head comprising:

a light source;

an objective lens for focusing light, which has been emitted from the light source, onto one of the tracks of the storage medium;

light receiving means including: a plurality of light receiving areas, which receive a first type of reflected rays where zero-order and first-order components of the light diffracted by the track are superposed one upon the other to generate a light quantity signal representing quantity of light of the first type of reflected rays; and a non-light-receiving area, which is provided between the light receiving areas so as not to receive a second type of reflected ray consisting essentially of the zero-order components, where as measured in a direction in which the first type of reflected rays are arranged, the non-light-receiving area is narrower than a shortest distance between the first type of reflected rays;

tracking error signal generating means for generating a tracking error signal based on the light quantity signal; and shifting means for changing a position of the lens parallel to the tracks responsive to a drive signal, wherein the control signal generating means generates a control signal for controlling the position of the lens such that the light follows the tracks on the storage medium in response to the tracking error signal, and wherein the driving means generates the drive signal for driving the shifting means in response to the control signal.

* * * * *

UNITED STATES PATENT AND TRADEMARK OFFICE
CERTIFICATE OF CORRECTION

| | | |
|---|---|---|
| PATENT NO. | : 7,706,216 B2 | Page 1 of 1 |
| APPLICATION NO. | : 10/533628 | |
| DATED | : April 27, 2010 | |
| INVENTOR(S) | : Akihiro Arai | |

It is certified that error appears in the above-identified patent and that said Letters Patent is hereby corrected as shown below:

Title Page, Item (54), the title should read
        -- OPTICAL HEAD AND OPTICAL DISC DRIVE INCLUDING THE OPTICAL HEAD --

Signed and Sealed this
Twelfth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,706,216 B2 | Page 1 of 1 |
| APPLICATION NO. | : 10/533628 | |
| DATED | : April 27, 2010 | |
| INVENTOR(S) | : Akihiro Arai | |

It is certified that error appears in the above-identified patent and that said Letters Patent is hereby corrected as shown below:

Title Page, Item (54) and at Column 1, lines 1 and 2 the title should read
-- OPTICAL HEAD AND OPTICAL DISC DRIVE INCLUDING THE OPTICAL HEAD --

This certificate supersedes the Certificate of Correction issued April 12, 2011.

Signed and Sealed this
Tenth Day of May, 2011

David J. Kappos
*Director of the United States Patent and Trademark Office*